(12) United States Patent
Hsieh et al.

(10) Patent No.: US 11,079,685 B2
(45) Date of Patent: Aug. 3, 2021

(54) METHOD OF MANUFACTURING PHOTO MASKS

(71) Applicant: TAIWAN SEMICONDUCTOR MANUFACTURING CO., LTD., Hsinchu (TW)

(72) Inventors: Ken-Hsien Hsieh, Hsinchu (TW); Ru-Gun Liu, Hsinchu (TW); Wei-Shuo Su, Hsinchu (TW)

(73) Assignee: TAIWAN SEMICONDUCTOR MANUFACTURING CO., LTD., Hsinchu (TW)

( * ) Notice: Subject to any disclaimer, the term of this patent is extended or adjusted under 35 U.S.C. 154(b) by 114 days.

(21) Appl. No.: 15/966,962

(22) Filed: Apr. 30, 2018

(65) Prior Publication Data

US 2019/0146333 A1 May 16, 2019

Related U.S. Application Data

(60) Provisional application No. 62/586,053, filed on Nov. 14, 2017.

(51) Int. Cl.

| G03F 7/00 | (2006.01) |
| G03F 7/20 | (2006.01) |
| H01L 21/311 | (2006.01) |
| G03F 1/36 | (2012.01) |
| G03F 1/70 | (2012.01) |
| G06F 30/398 | (2020.01) |
| G06F 119/18 | (2020.01) |

(52) U.S. Cl.
CPC ............ *G03F 7/70466* (2013.01); *G03F 1/36* (2013.01); *G03F 1/70* (2013.01); *G06F 30/398* (2020.01); *H01L 21/31144* (2013.01); *G06F 2119/18* (2020.01)

(58) Field of Classification Search
CPC .......... G03F 7/70466; G03F 1/70; G03F 1/36; G06F 30/398; G06F 2119/18; H01L 21/31144
See application file for complete search history.

(56) References Cited

U.S. PATENT DOCUMENTS

| 8,484,607 | B1 * | 7/2013 | Tang | ................... G03F 7/70466 716/136 |
| 8,875,065 | B1 * | 10/2014 | Lin | ......................... G06F 30/18 716/52 |
| 8,910,095 | B2 * | 12/2014 | Li | ........................... G06F 30/39 716/55 |

(Continued)

*Primary Examiner* — Naum Levin
(74) *Attorney, Agent, or Firm* — McDermott Will & Emery LLP

(57) ABSTRACT

In a method of manufacturing a photo mask used in a semiconductor manufacturing process, a mask pattern layout in which a plurality of patterns are arranged is acquired. The plurality of patterns are converted into a graph having nodes and links. It is determined whether the nodes are colorable by N colors without causing adjacent nodes connected by a link to be colored by a same color, where N is an integer equal to or more than 3. When it is determined that the nodes are colorable by N colors, the nodes are colored with the N colors. The plurality of patterns are classified into N groups based on the N colored nodes. The N groups are assigned to N photo masks. N data sets for the N photo masks are output.

20 Claims, 24 Drawing Sheets

(56) References Cited

U.S. PATENT DOCUMENTS

| | | | |
|---|---|---|---|
| 9,122,838 B2* | 9/2015 | Lin | G06F 30/398 |
| 9,158,885 B1* | 10/2015 | Gray | G03F 7/70433 |
| 9,176,373 B2* | 11/2015 | Cheng | G06F 30/398 |
| 9,384,319 B2* | 7/2016 | Cilingir | G03F 1/36 |
| 9,514,266 B2* | 12/2016 | Tsai | G03F 7/0035 |
| 9,652,581 B2* | 5/2017 | Pikus | G06F 30/392 |
| 9,679,095 B1* | 6/2017 | Li | G06F 30/39 |
| 9,747,407 B2* | 8/2017 | Choi | G03F 1/70 |
| 9,874,810 B2* | 1/2018 | Jung | G03F 1/70 |
| 10,013,520 B2* | 7/2018 | Lin | G06F 30/398 |
| 10,078,718 B2* | 9/2018 | Hsieh | G03F 1/70 |
| 10,204,205 B2* | 2/2019 | Cheng | G06F 30/392 |
| 10,223,496 B2* | 3/2019 | Lvov | G06F 30/398 |
| 10,274,829 B2* | 4/2019 | Hsieh | G03F 7/70466 |
| 10,354,886 B2* | 7/2019 | Cilingir | G03F 7/70433 |
| 10,430,544 B2* | 10/2019 | Tsai | G03F 1/36 |
| 10,515,185 B2* | 12/2019 | Cheng | G03F 1/70 |
| 2014/0237436 A1* | 8/2014 | Li | G06F 30/00 716/55 |

* cited by examiner

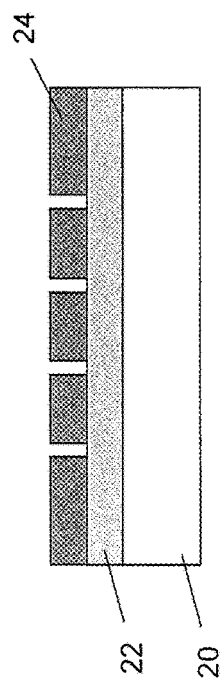
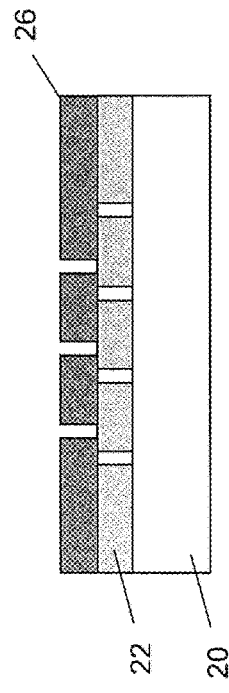
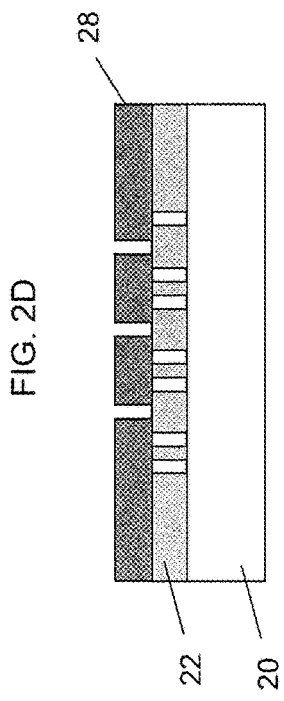
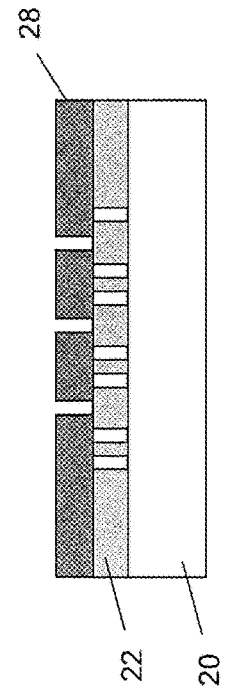
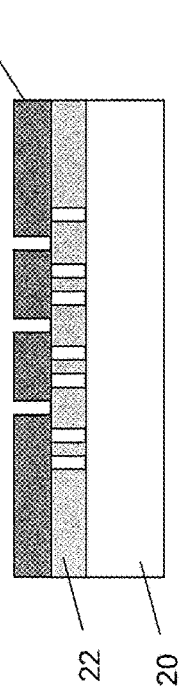
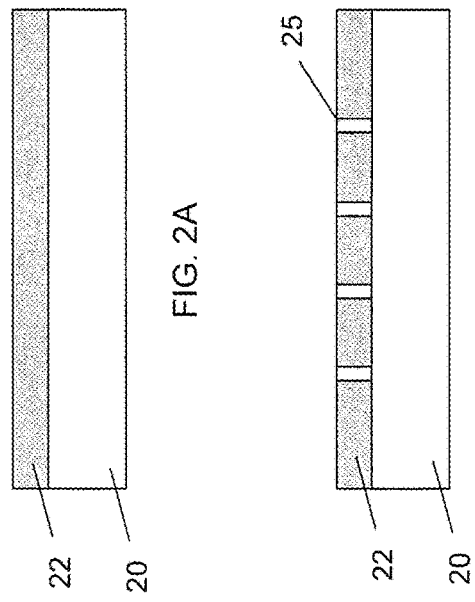
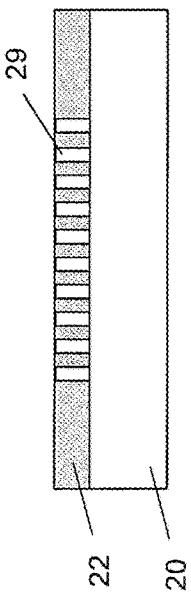

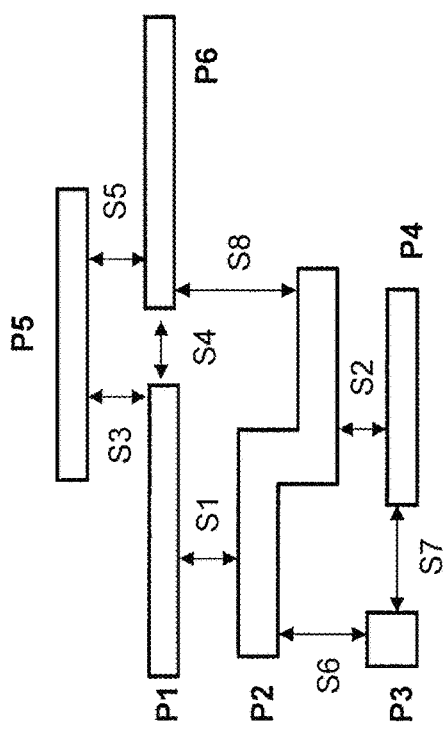
FIG. 7A
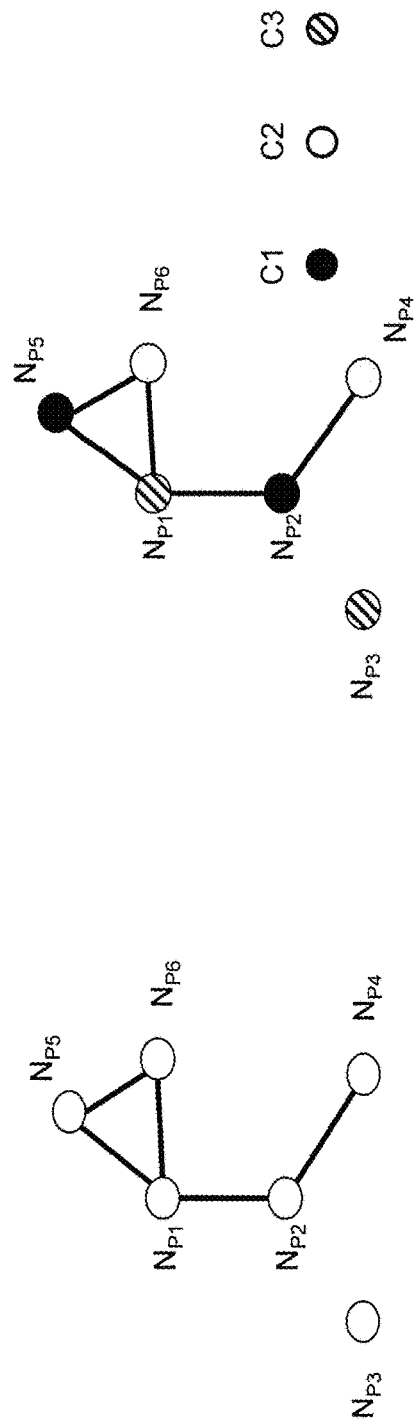
FIG. 7C
FIG. 7B

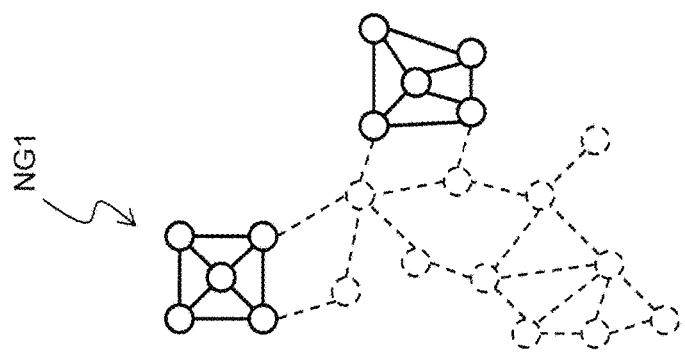
FIG. 9B
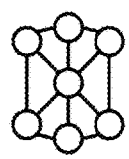
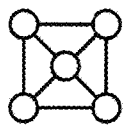
FIG. 9C
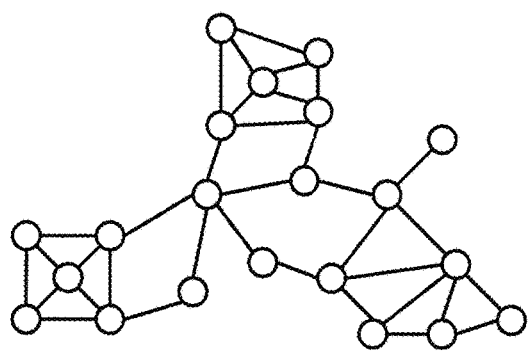
FIG. 9A

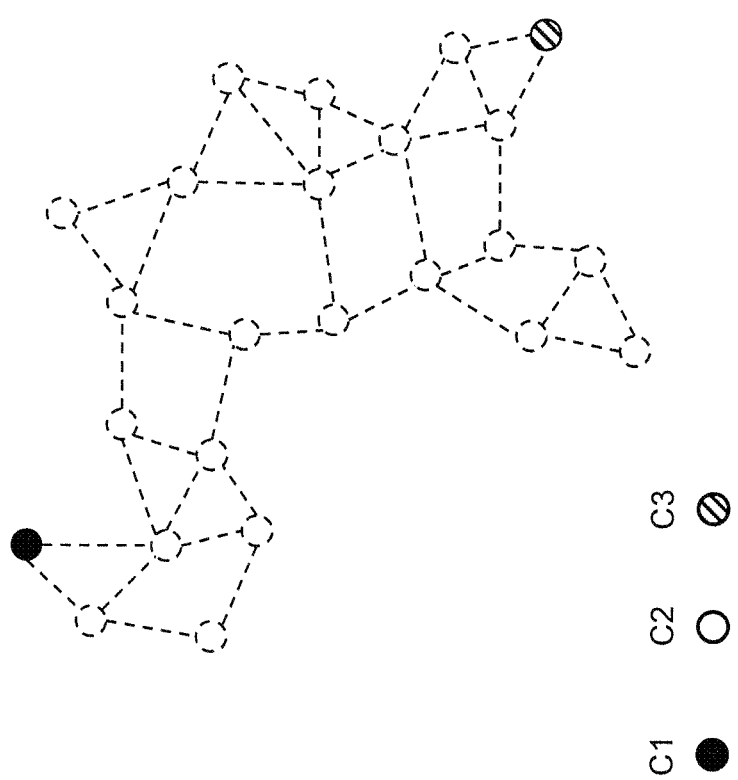

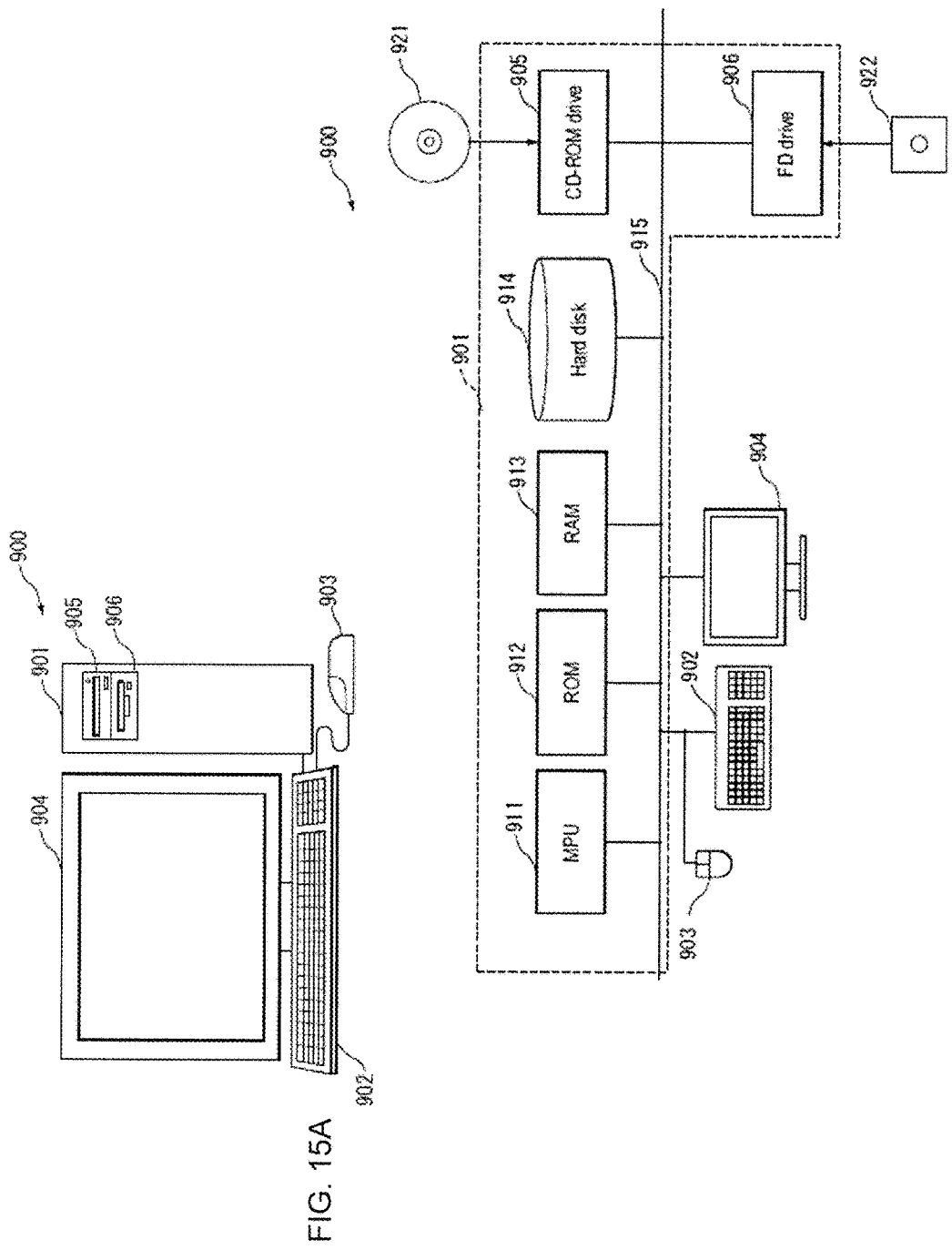

METHOD OF MANUFACTURING PHOTO MASKS

RELATED APPLICATIONS

This application claims priority of Provisional Application No. 62/586,053 filed on Nov. 14, 2017, the entire contents of which are incorporated herein by reference.

TECHNICAL FIELD

The disclosure relates to methods of manufacturing photo masks used in a semiconductor manufacturing process and methods of patterning using the photo masks.

BACKGROUND

As semiconductor device feature sizes have decreased to sizes smaller than the wavelength of light used in photolithographic processes, the diffraction of light at feature pattern edges formed on the reticle causes a loss of resolution in transferring the reticle pattern to the wafer photoresist. Although patternable minimum resolution (e.g., pattern pitch) is limited by an optical lithography tool (e.g., optical scanner/stepper), design rule for a semiconductor device requires smaller or finer pattern resolution.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

FIG. 2A shows cross sectional views illustrating a multiple patterning operation.

FIG. 2B shows cross sectional views illustrating a multiple patterning operation.

FIG. 2C shows cross sectional views illustrating a multiple patterning operation;

FIG. 2D shows cross sectional views illustrating a multiple patterning operation;

FIG. 2E shows cross sectional views illustrating a multiple patterning operation;

FIG. 2F shows cross sectional views illustrating a multiple patterning operation;

FIG. 2G shows cross sectional views illustrating a multiple patterning operation;

FIG. 7A shows a method of assigning mask patterns into multiple photo masks according to an embodiment of the present disclosure;

FIG. 7B shows a method of assigning mask patterns into multiple photo masks according to an embodiment of the present disclosure;

FIG. 7C shows a method of assigning mask patterns into multiple photo masks according to an embodiment of the present disclosure.

FIG. 9A shows a graph simplification process resulting in non-removable nodes. FIG. 9B shows a graph simplification process resulting in non-removable nodes. FIG. 9C shows examples of colorable graphs.

FIG. 12C shows a graph simplification method according to another embodiment of the present disclosure.

FIG. 15A shows a photo mask data analyzing apparatus according to an embodiment of the present disclosure;

FIG. 15B shows a photo mask data analyzing apparatus according to an embodiment of the present disclosure.

DETAILED DESCRIPTION

It is to be understood that the following disclosure provides many different embodiments, or examples, for implementing different features of the invention. Specific embodiments or examples of components and arrangements are described below to simplify the present disclosure. These are, of course, merely examples and are not intended to be limiting. For example, dimensions of elements are not limited to the disclosed range or values, but may depend upon process conditions and/or desired properties of the device. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Various features may be arbitrarily drawn in different scales for simplicity and clarity.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The device may be otherwise oriented (rotated 90 degrees or at other orientations) and the spatially relative descriptors used herein may likewise be interpreted accordingly. In addition, the term "made of" may mean either "comprising" or "consisting of." In the present disclosure, a phrase "one of A, B and C" means "A, B and/or C" (A, B, C, A and B, A and C, B and C, or A, B and C), and does not mean one element from A, one element from B and one element from C, unless otherwise described.

Embodiments of the present disclosure provide a method of manufacturing a photo mask used in a manufacturing operation of a semiconductor device, a method of manufacturing a semiconductor device and an apparatus for verifying a pattern layout and generating mask data for photo masks.

One of the methods for fabricating fine patterns below the resolution limit of an optical lithography tool is a multiple patterning operation. FIGS. 1A-1D and 2A-2G show the multiple patterning operations relating to an embodiment of the present disclosure.

Figure 1D:
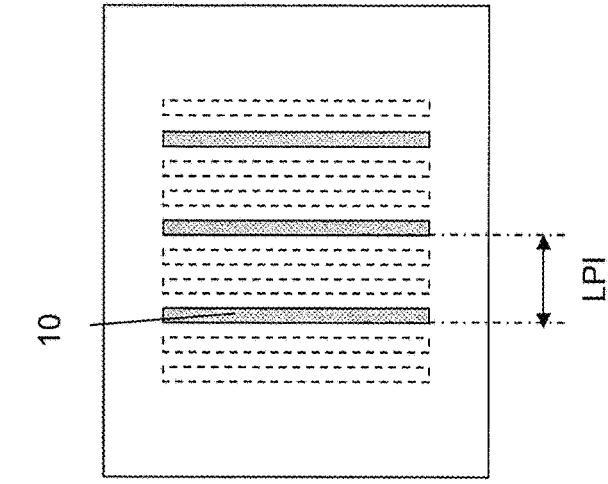
FIG. 1D shows pattern layouts for multiple photo masks.
Figure 1A:
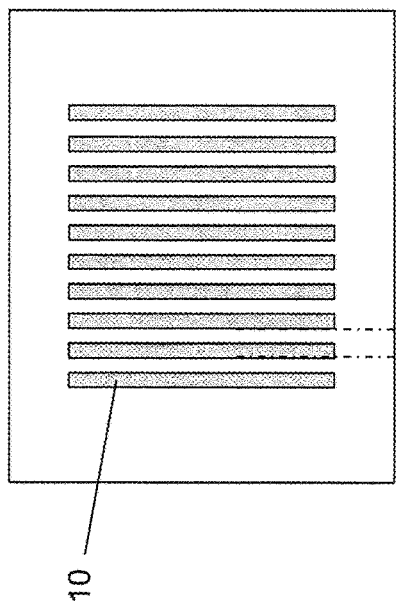
FIG. 1A shows a design pattern layout.

FIG. 1A shows a design pattern layout including line-and-space patterns 10 arranged with a pitch P1. The pitch PI is smaller than the resolution limit LPI of an optical lithography tool. The resolution limit may be influenced not only by the optical lithography tool but also by a photo resist process, an etching process and/or one or more other patterning processes. In the case of FIGS. 1A-1D, the patterns 10 are spaces for fabricating grooves in a targeted layer.

Figure 1C:
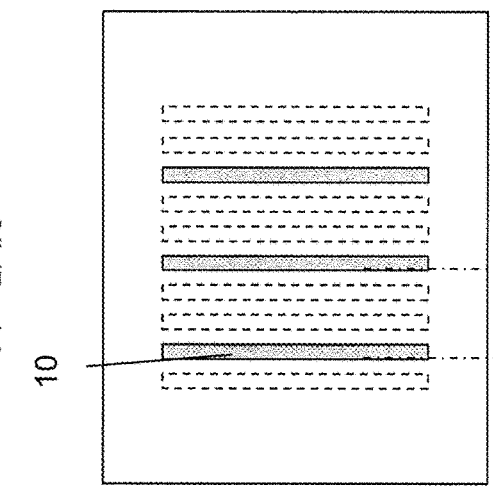
FIG. 1C shows pattern layouts for multiple photo masks.
Figure 1B:
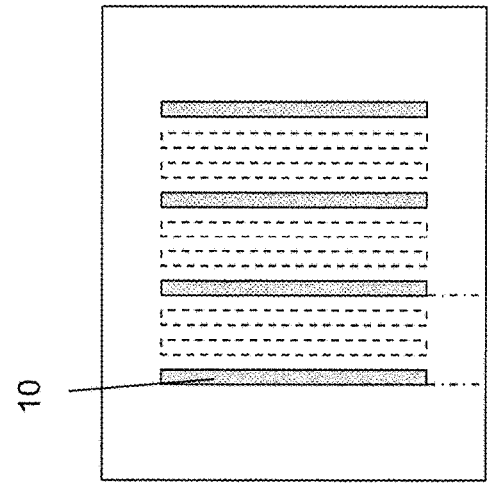
FIG. 1B shows pattern layouts for multiple photo masks.

For example, when the pitch of the patterns to be fabricated is about one-third of the resolution limit (i.e., LPI/3), the designed patterns shown in FIG. 1A are divided into three groups as shown in FIGS. 1B-1D, such that within each group of patterns, the pattern pitch is equal to or more than the resolution limit LPI.

FIGS. 2A-2G show cross sectional views of illustrating a multiple (triple) patterning operation. It is understood that in the sequential manufacturing process, one or more additional operations can be provided before, during, and after the stages shown in FIGS. 2A-2G, and some of the operations described below can be replaced or eliminated for additional embodiments of the method. The order of the operations/processes may be interchangeable.

As shown in FIG. 2A, a target layer 22 to be patterned is formed over a semiconductor substrate 20. The semiconductor substrate 20 is, for example, a silicon wafer. The target layer 22 is an insulating layer and/or a conductive layer and is a single layer or multiple layers. One or more additional layers and/or one or more devices are disposed between the substrate 20 and the target layer 22.

As shown in FIG. 2B, a first lithography operation is performed by using a first photo mask corresponding to the pattern shown in FIG. 1B, thereby forming a resist pattern 24. The pattern pitch is equal to or greater than the resolution limit. Then, as shown in FIG. 2C, the target layer 22 is etched by using the resist pattern 24 as an etching mask. The etching is, for example, plasma dry etching. Further, as shown in FIG. 2D, a second lithography operation is performed by using a second photo mask corresponding to the pattern shown in FIG. 1C, thereby forming a resist pattern 26. Then, as shown in FIG. 2E, the target layer 22 is etched by using the resist pattern 26 as an etching mask. Subsequently, as shown in FIG. 2F, a third lithography operation is performed by using a third photo mask corresponding to the pattern shown in FIG. 1D, thereby forming a resist pattern 28, and then, as shown in FIG. 2G, the target layer 22 is etched by using the resist pattern 28 as an etching mask. Accordingly, etched patterns (e.g., grooves) having a smaller pitch than the resolution limit can be formed.

In the forgoing case, the patterns are divided into three (3) groups and three photo masks are utilized. The number of divisions (i.e., the number of photo masks) is not limited to three, and can be equal to two (2) or four (4) or more.

In the case of simple line-and-space patterns 10 as shown in FIG. 1A, it is easy to divide the patterns into multiple groups. However, in an actual semiconductor device, the pattern layout is complex having various shapes and sizes, and includes a huge number of patterns. Thus, grouping or a mask assignment of the patterns is one of the major challenges in multiple patterning operations.

The mask assignment problem corresponds to the "N-coloring problem" in a graph theory (N is an integer of 2 or more). According to the graph theory, the N≥3 coloring problem has no fast and general method of solving, and this also creates challenges in a semiconductor manufacturing process utilizing a triple or more patterning technology. In the mask assignment, when the patterns are colorable by N colors (i.e., any adjacent two patterns having a space below a threshold value are colored by different colors), the patterns can be divided or grouped into N groups for N photo masks, respectively. There are some methods proposed to deal with the problem of N≥3 mask assignment. However they are not capable of handling the layouts with partially predefined colors.

In the present disclosure, a practical method is provided to verify whether given mask patterns can be N-colored, i.e., divided into N photo masks and a method to generate N mask data for the N photo masks. In the present disclosure, the cases where N is an integer of 3 or more are described. However, the disclosed techniques can be allied to the case where N is two (2). It is noted that "colors" in this disclosure does not mean an actual color, but generally means being categorized differently.

In the following embodiments, a part of or all of the processes, methods and/or operations described below are performed by a computer system including one or more processors and one or more memories storing a program. An executed program can perform a part of or all of the processes, methods and/or operations described below.

Figure 3A:
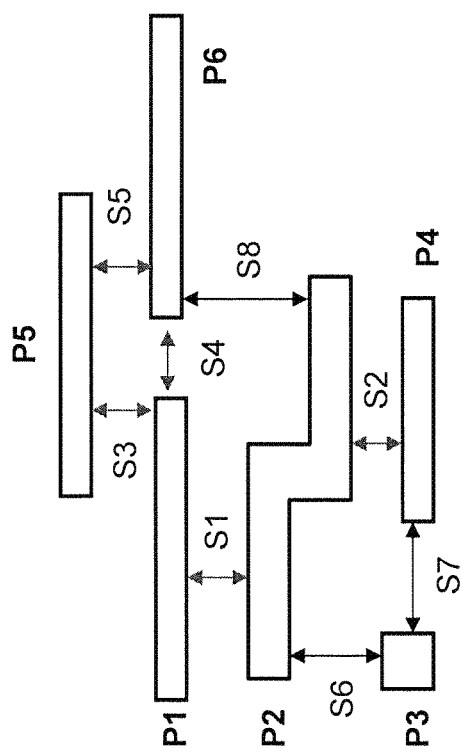
FIG. 3A shows a pattern layout and FIG. 3B shows a graph expression of the pattern layout of FIG. 3A.
Figure 3B:
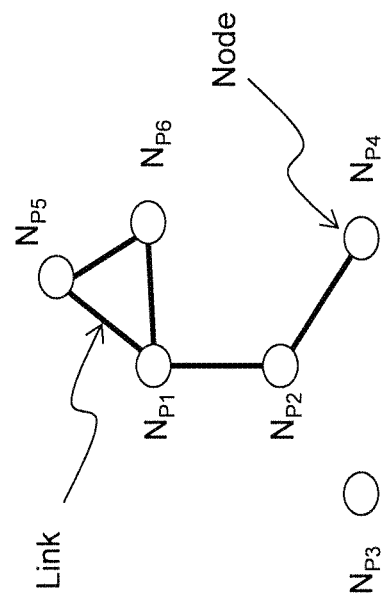

FIG. 3A shows a pattern layout and FIG. 3B shows a graph expression of the pattern layout of FIG. 3A. The pattern layout is generally expressed by polygon data in, for example, GDS-II stream format or in Open Artwork System Interchange Standard format. When the minimum distance between two patterns is equal to or less than a threshold distance, these two patterns are not placed on the same photo mask. The threshold distance is substantially equal to (the resolution limit of an optical lithography tool)/N, where N is the number of photo masks for multiple patterning. For example, space S1 between patterns P1 and P2 is equal to or less than the threshold distance, and thus pattern P1 and pattern P2 should be assigned to different photo masks. Similarly, space S2 between patterns P2 and P4, space S3 between patterns P1 and P5, space S4 between patterns P1 and P6 and space S5 between patterns P5 and P6 are equal to or less than the threshold, and thus the pairs of the patterns should not be assigned to the same mask.

When the minimum distance between two patterns is greater than the threshold distance, these two patterns may be assigned to the same mask or may be assigned to different masks. For example, space S6 between pattern P2 and pattern P3 is greater than the threshold, and thus pattern P2 and pattern P3 can be assigned to the same mask or may be assigned to different masks. Similarly, space S7 between pattern P3 and pattern P4 is greater than the threshold, and thus pattern P3 and pattern P4 can be assigned to the same mask or may be assigned to different masks, and space S8 between pattern P2 and pattern P6 is greater than the threshold, and thus pattern P2 and pattern P6 can be assigned to the same mask or may be assigned to different masks. As set forth above, pattern P2 and pattern P4 are not assigned to the same mask.

In other embodiments, not only a distance to the immediately adjacent pattern but also any patterns located within the threshold distance is searched. In such a case, all patterns located within the threshold distance from a given pattern should not be assigned to the same photo mask. For example, in FIG. 3A, if the minimum distance between pattern P2 and pattern P5 is equal to or less than a threshold distance, the pattern P5 and pattern P1 are not assigned to the same photo mask as pattern P2.

In the foregoing embodiments, the condition to determine the mask assignment is whether the minimum distance between two patterns is equal to or less than a threshold distance or greater than the threshold distance. In other embodiments, the condition to determine the mask assignment is whether the minimum distance between two patterns is less than a threshold distance or equal to or greater than the threshold distance.

To determine whether the given pattern layout can be assigned to N photo masks without violating the spacing rule, each of the polygons (patterns) in the pattern layout is converted into nodes (or vertices). Further, when the minimum distance between two patterns is equal to or smaller than the threshold distance, these two patterns are connected by a link (or an edge). FIG. 3B shows a graph expression of the pattern layout FIG. 3A according to the aforementioned spacing rule. In FIG. 3B, nodes $N_{P1}$, $N_{P2}$, ... and $N_{P6}$ correspond to patterns P1, P2, ... and P6 of FIG. 3A. As shown in FIG. 3B, the node $N_{P2}$ are connected by links to nodes $N_{P1}$ and $N_{P4}$, node $N_{P1}$ is connected to by links to three nodes $N_{P2}$, $N_{P5}$ and $N_{P6}$. In contrast, node $N_{P3}$ is connected to no other nodes.

Figure 4:
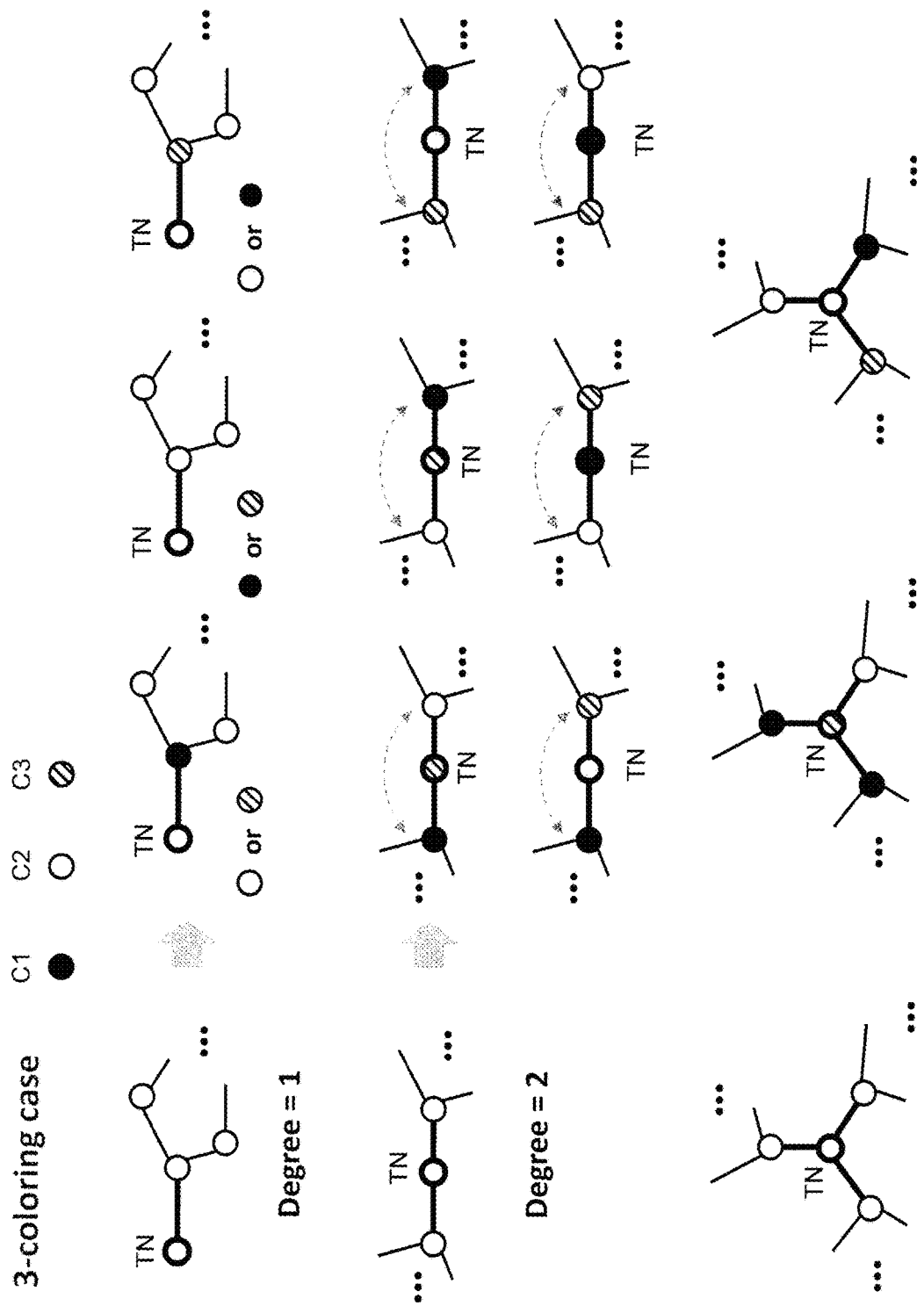
FIG. 4 shows a coloring process and coloring problems in a graph representation for a three color (N=3) case.

FIG. 4 shows a coloring process and coloring problems in a graph representation for a three color (N=3) case. FIG. 4 shows colorable cases and un-colorable cases with respect to the number of links (degree). When the degree is one (1), which means that a given node TN (target node to be colored) has only one link, the target node is always colorable regardless the color (C1, C2 or C2) of the node connected to the target node TN. In the case where the degree is two (2), which means that a given node TN has only two links, the target node is always colorable regardless of the colors of the nodes connected to the target node TN. In other words, when the number of links of a given target is less than N, the given target is always is colorable. Of course, when a given node is connected to no other nodes (no link), the degree is zero and this node can always be colorable by any color.

In contrast, when the degree is three (3), which means that a given node has three links, there is a case where the target node is not colored depending on the colors around the target node TN. In FIG. 4, when the three nodes around the target node TN are colored only by two (or one) colors C1 and C2, the target node TN can be colored by C3. However, when the three nodes around the target node TN are colored by three colors C1, C2 and C3, the target node TN cannot be colored.

As shown in FIG. 4, when the degree of a given node is less than N, the given node is not significant to coloring. In the present embodiments, by identifying significant nodes and removing the significant nodes repeatedly, the graph is simplified to determine whether the graph is colorable by N colors.

Figure 5B:
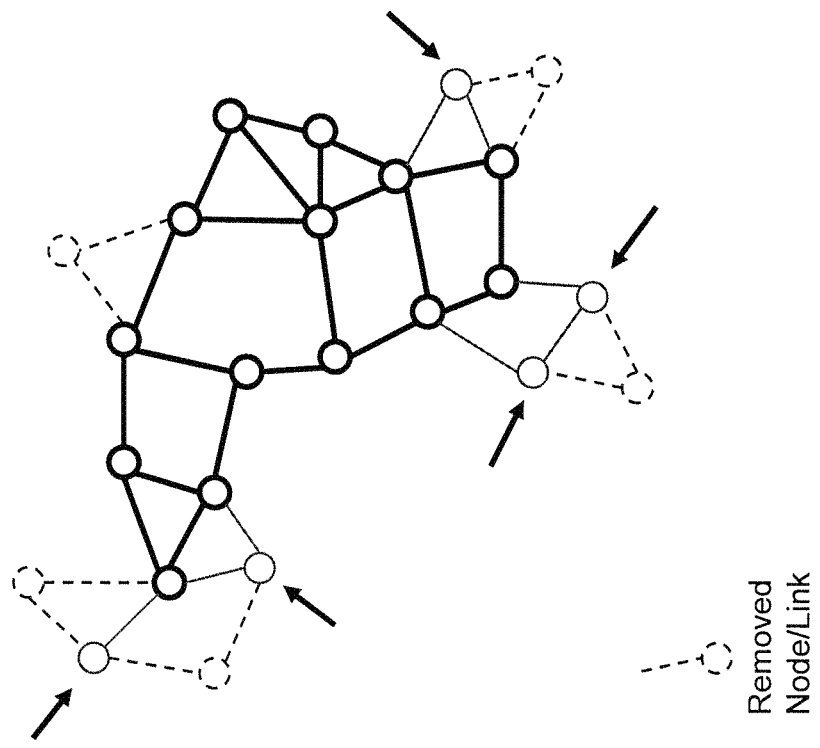
FIG. 5B shows a graph simplification method according to an embodiment of the present disclosure.
Figure 5A:
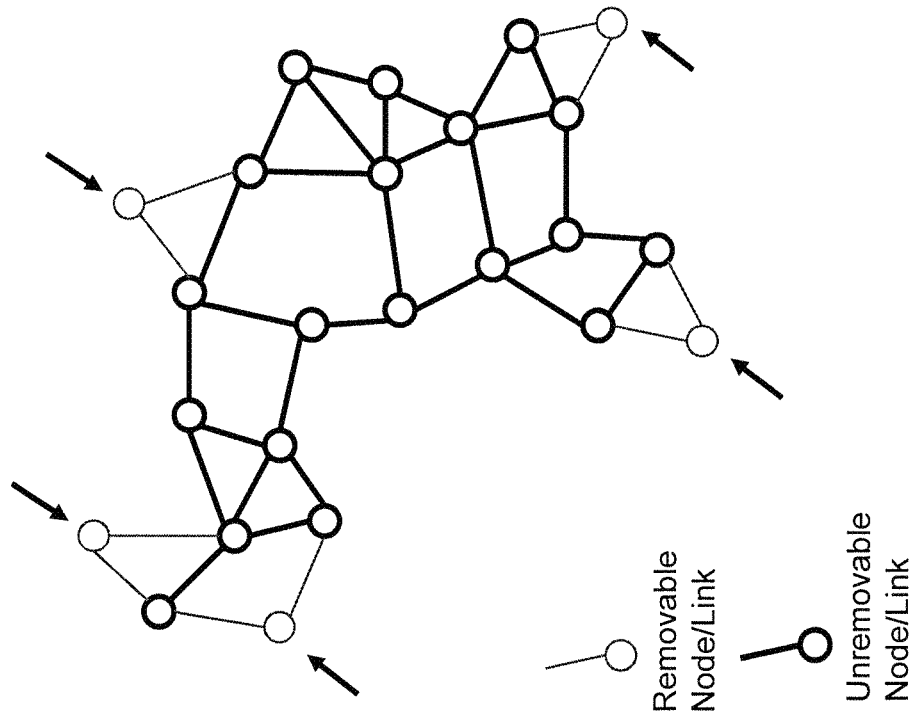
FIG. 5A shows a graph simplification method according to an embodiment of the present disclosure.

FIGS. 5A-5D show a graph simplification method according to an embodiment of the present disclosure. In FIGS. 5A-5D, the number of colors (N) is three (3). Thus, a node having only one or two links is an insignificant node. For example, in FIG. 5A, five nodes indicated by an arrow having only two links (degree=2) connected to two other nodes, respectively, are identified. Then, the five insignificant nodes are removed from the original graph together with the links connected to the removed insignificant nodes, as shown in FIG. 5B. After the removal of the five insignificant nodes, the remaining graph is analyzed to find new insignificant nodes caused by the removal of the five insignificant nodes. As shown in FIG. 5B, five new nodes indicated by the arrows are identified as new insignificant nodes. Then, the identified new five insignificant nodes are moved from the graph together with the links.

Figure 5D:
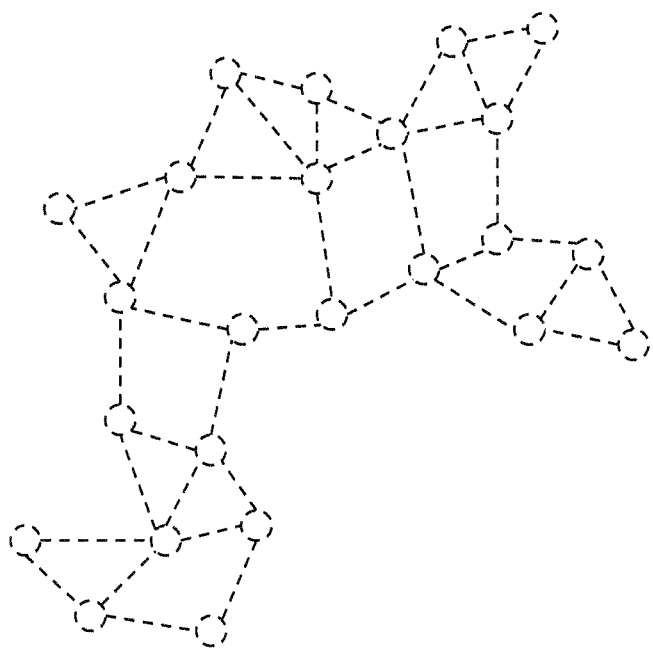
FIG. 5D shows a graph simplification method according to an embodiment of the present disclosure.
Figure 5C:
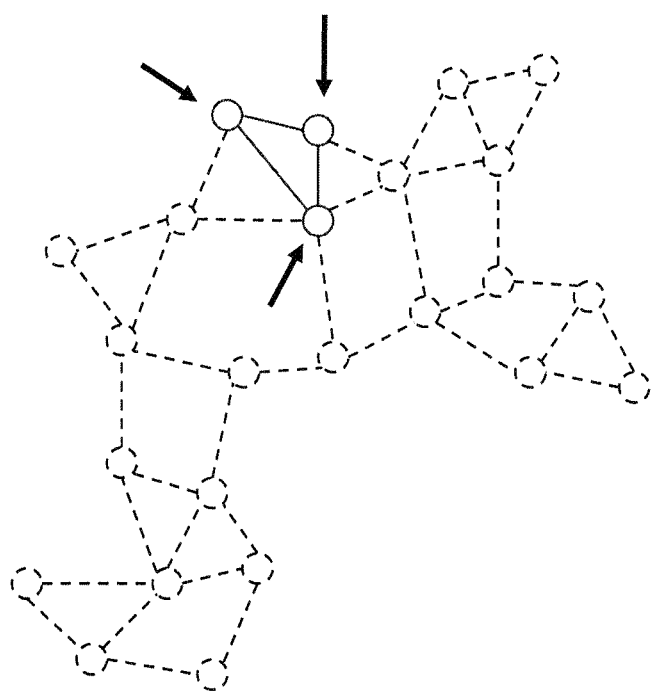
FIG. 5C shows a graph simplification method according to an embodiment of the present disclosure.

By repeating the identification of one or more insignificant nodes and removal thereof, the graph becomes smaller and smaller as shown in FIG. 5C. Further in FIG. 5C, the remaining three nodes indicated by the arrow are all insignificant nodes and thus are removable. When as shown in FIG. 5D, all nodes included in the original graph are removed, it is determined that the original graph is colorable by three (N=3) colors. In other words, a pattern layout corresponding to the original graph can be divided into three mask patterns for multiple patterning processes.

When it is determined that the original graph is colorable by three (N=3) colors, the nodes are colored by three colors, each of which correspond to a set of mask data for one of the multiple photo masks.

Figure 6B:
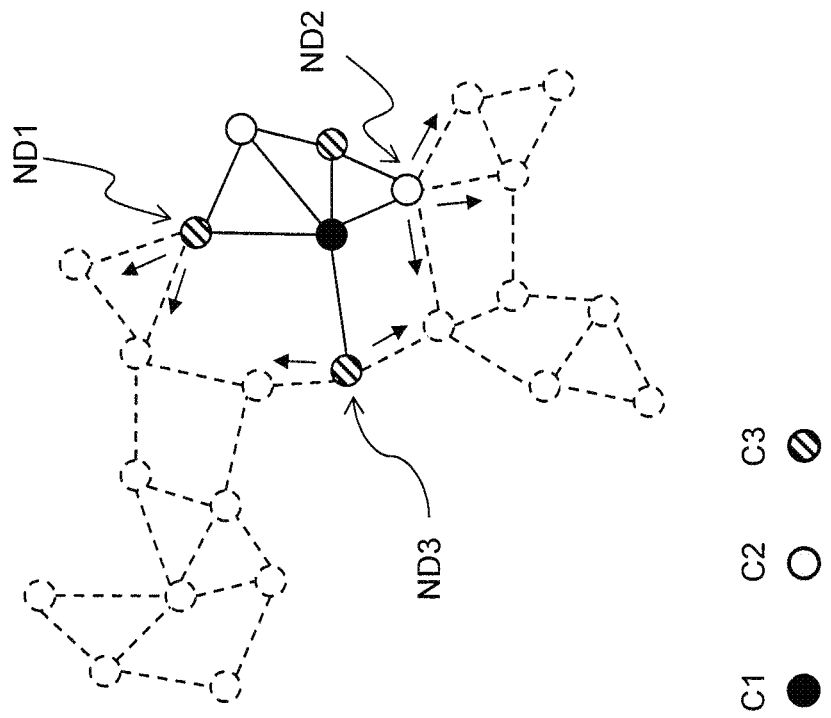
FIG. 6B shows a graph coloring method according to an embodiment of the present disclosure.
Figure 6A:
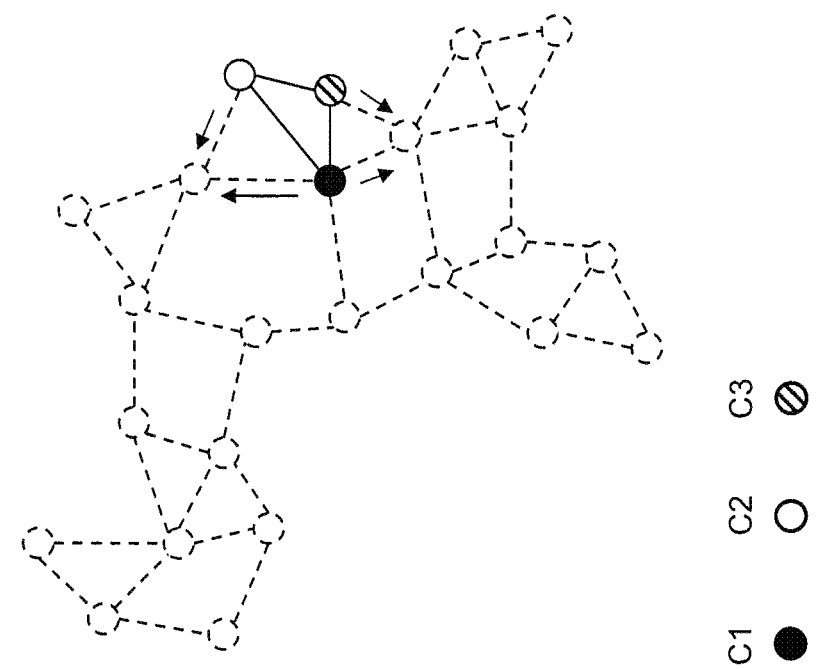
FIG. 6A shows a graph coloring method according to an embodiment of the present disclosure.

In some embodiments, the coloring starts with the graph shown in FIG. 5C, which is just before the step of all nodes are removed. As shown in FIG. 6A, the remaining three nodes are colored by three colors C1, C2 and C3. Then, as shown in FIG. 6B, a color for the nodes connected to the colored three nodes is determined. When a given non-colored node ND1 is connected to two nodes having been colored (e.g., colors C1 and C2), a choice of the color for the given node ND1 is only one (e.g., C3). Similarly, for a given non-colored node ND2 connected to two nodes having been colored (e.g., colors C1 and C3), a choice of the color for the given node ND2 is only one (e.g., C2). In some embodiments, the nodes having only one color choice are first colored.

When a given non-colored node ND3 is connected to one node having been colored (e.g., color C1), there are two choices of the color for the given node ND3 (e.g., colors C2 or C3). In some embodiments, the color for the node ND3 is freely chosen to be either color C2 or color C3. In other embodiments, the color for the node ND3 is chosen by considering a number balance of the colors. In the case of FIG. 6B, after the nodes ND1 and ND2 having only one color choice are colored, a color for the node ND3 is determined. Since at the time of coloring the node ND3, there are one node having color C1, two nodes having color C2 and two nodes having color C3, the node ND3 can be colored by either color C2 or color C3. If at the time of coloring the node ND3, the number of nodes having color C2 is smaller than the number of nodes having color C3, the node ND3 is colored by color C2. Further, in some embodiments, the nodes are colored so as to avoid the same colors being assigned to two nodes connected to the same node, where it is possible.

Figure 6C:
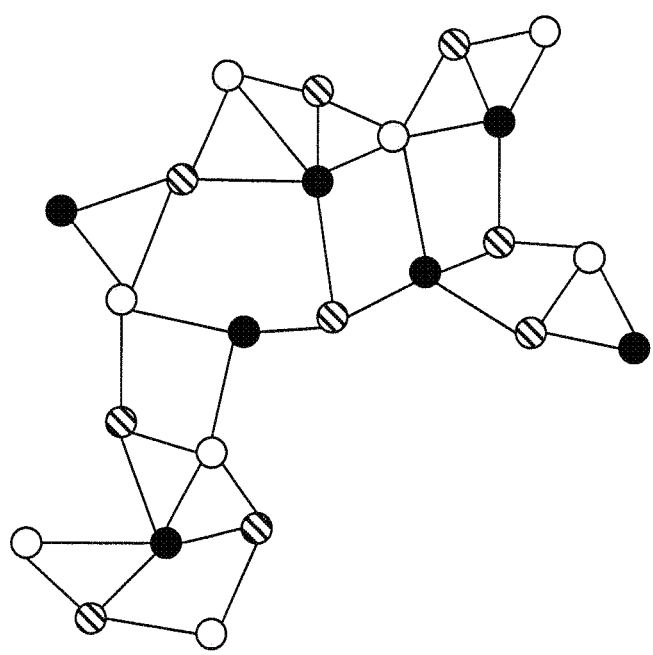
FIG. 6C shows a graph coloring method according to an embodiment of the present disclosure.

By repeating the coloring as shown in FIGS. 6A and 6B, all of the nodes in the original graph are colored by N colors (N=3) as shown in FIG. 6C.

The aforementioned method is further described with the pattern layout shown in FIG. 3A. FIGS. 7A-8D show a method of assigning mask patterns into multiple photo masks according to an embodiment of the present disclosure.

Figure 8B:
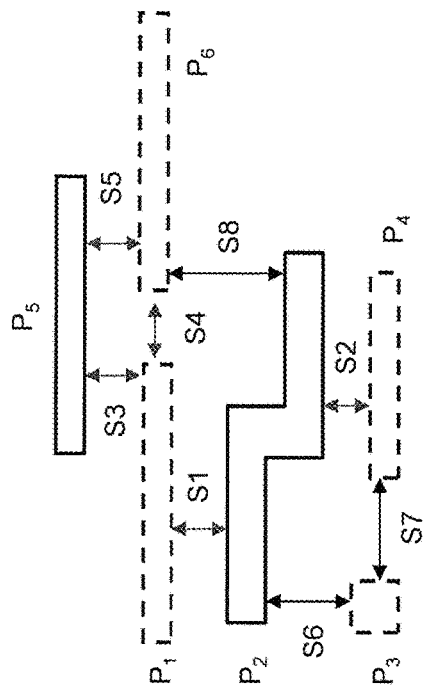
FIG. 8B shows a method of assigning mask patterns into multiple photo masks according to an embodiment of the present disclosure.
Figure 8D:
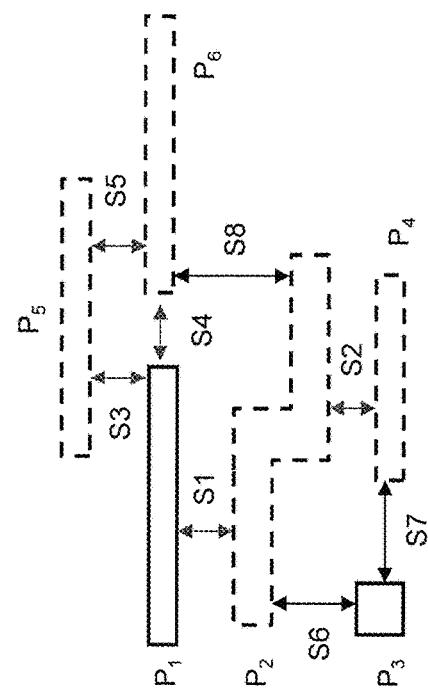
FIG. 8D shows a method of assigning mask patterns into multiple photo masks according to an embodiment of the present disclosure.
Figure 8A:
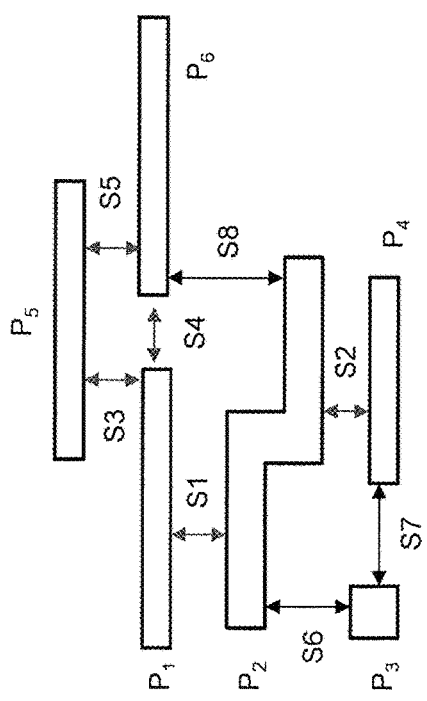
FIG. 8A shows a method of assigning mask patterns into multiple photo masks according to an embodiment of the present disclosure.

FIGS. 7A and 8A are the same as FIG. 3A, which illustrate an original pattern layout including six (6) patterns. Due to the minimum distances between the patterns and the resolution limits of an optical lithography tool, a multiple patterning process using N photo masks are employed. Here, it is assumed that three (N=3) photo masks are used to fabricate the original patterns shown in FIG. 7A into a target layer.

As shown in FIG. 7B, the original pattern layout of FIG. 7B is converted into a graph expression shown in FIG. 7B, which is the same as FIG. 3B. Then, the graph simplification process is applied to the graph of FIG. 7B. For example, node $N_{P3}$ having no link is first removed. Next, node $N_{P4}$, of which degree (the number of links) is one, is removed. Then, node $N_{P2}$, of which degree now becomes one is removed. The remaining graph includes nodes $N_{P1}$, $N_{P5}$ and $N_{P6}$, which have two links (degree=2) can also be removed. Thus, the original graph shown in FIG. 7B is colorable by three colors (N=3), which means that the original pattern layout shown in FIG. 7A can be divided into three data sets for three different photo masks.

Subsequently, in order to assign the mask patterns P1-P6 to three photo masks, the graph is colored as shown in FIG. 7C. First, the colors for nodes $N_{P1}$, $N_{P5}$ and $N_{P6}$ are assigned, and then the colors for node $N_{P2}$ and node $N_{P4}$ are determined. In some embodiments, since the color for node $N_{P1}$ is color C3, color C2 is selected for node $N_{P4}$. Similarly, since the numbers of color C1 and color C2 are two, color C3 is selected for node $N_{P4}$.

Figure 8C:
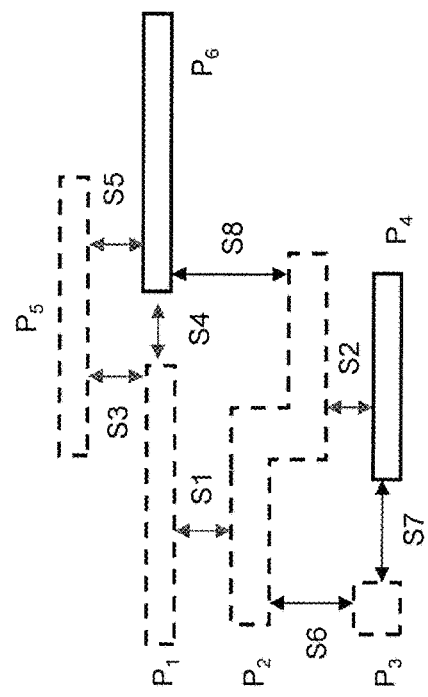
FIG. 8C shows a method of assigning mask patterns into multiple photo masks according to an embodiment of the present disclosure.

Based on the coloring result shown in FIG. 7C, the original pattern layout shown in FIG. 8A is divided into three groups, as shown in FIGS. 8B, 8C and 8D. The patterns P2 and P5, which correspond to node $N_{P2}$ and $N_{P5}$ colored by color C1 are grouped for one of three photo masks, the patterns P4 and P6, which correspond to node $N_{P4}$ and $N_{P6}$ colored by color C2 are grouped for one of three photo masks, and the patterns P1 and P3, which correspond to node $N_{P1}$ and $N_{P3}$ colored by color C3 are grouped for one of three photo masks. Based on the groups of mask patterns, three sets of mask data for three photo masks are output. The data format of the sets of mask data is the same as that of the original pattern layout in some embodiments.

The foregoing embodiments explain the cases in which all nodes are removable in the simplification process. In other embodiments, the simplification process results in unremoved nodes.

FIGS. 9A and 9B show the case in which some of the nodes of the original graph are not removable in the simplification process in some embodiments. After the simplification process as set forth above is performed on the original graph shown in FIG. 9A, there are some remaining groups of nodes NG1 in the remaining graph.

In some embodiments, it is determined whether the remaining group of nodes NG1 is a known colorable graph. FIG. 9C shows examples of known three-colorable graphs.

When it is determined that the remaining group of nodes NG1 is a known colorable graph, the entire original graph is determined as colorable.

In contrast, when the remaining group of nodes NG1 is not a known colorable graph, it is determined whether the remaining group of nodes NG1 is colorable by using a known algorithm. Since the size of the graph has been shrunk by the simplification process, the determination whether or not the remaining graph is colorable can be performed within a practical amount time. Then, when the remaining group of nodes NG1 is determined as colorable, the entire original graph is determined as colorable.

Figure 10B:
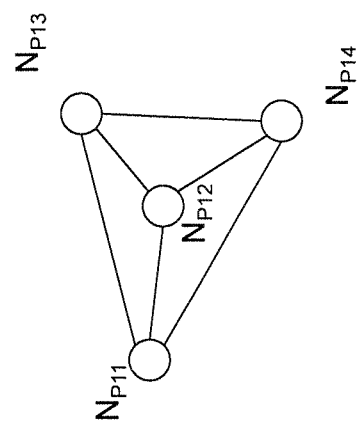
FIG. 10A shows a pattern layout and FIG. 10B shows a graph expression of the pattern layout of FIG. 10B.
Figure 10A:
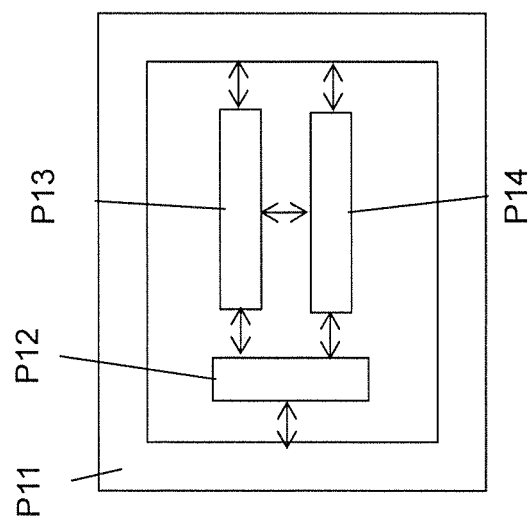

In some embodiments, the remaining group of nodes NG1 is determined as un-colorable. FIGS. 10A and 10B show an example of un-colorable patterns and the corresponding graph representation, where N=3. The minimum distances between pattern P11 and patterns P12, P13 and P14 are equal to or less than the threshold distance, the distance between pattern P12 and pattern P13 and the distance between pattern P12 and pattern P14 are equal to or less than the threshold distance, and further the distance between pattern P13 and pattern P14 is equal to or less than the threshold distance. Accordingly, nodes $N_{P11}$, $N_{P12}$, $N_{P13}$ and $N_{P14}$ corresponding to the patterns P11, P12, P13 and P14, respectively, are connected by links with each other, as shown in FIG. 10B. The graph shown in FIG. 10B cannot be colored by three colors.

When the remaining group of nodes NG1 is determined as un-colorable, the computer system outputs a notification that there are one or more groups of nodes that cannot be colored. Based on the notification, a layout designer can modify the patterns identified as un-colorable. For example, in the case of FIG. 10A, it may be possible to expand the distance between pattern P14 and pattern P13 to have the minimum distance greater than the threshold distance. In such a case, the link between nodes $N_{P13}$ and $N_{P14}$ is removed, and thus the graph becomes colorable by three colors.

In some embodiments of the present disclosure, one or more patterns in the original pattern layout are pre-assigned (designated patterns) to one or more specific photo masks by, for example, reasons of the manufacturing process. In such a case, in the graph representation, one or more nodes corresponding to the designated patterns are pre-colored.

FIGS. 10C-10I show another case in which some of the nodes of the original graph are not completely removable in the simplification process in some embodiments.

Figure 10C:
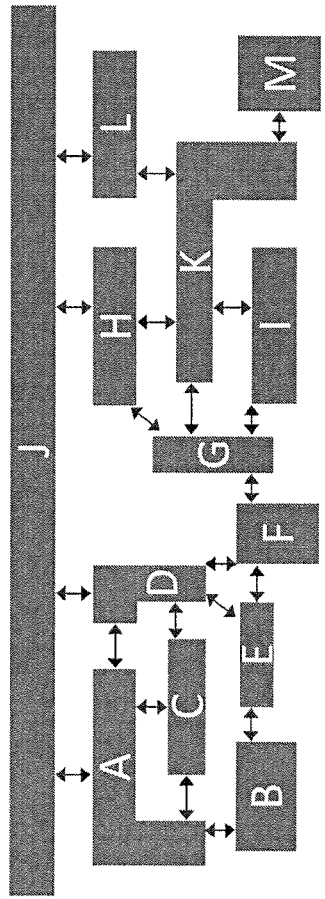
FIG. 10C shows a graph simplification method according to an embodiment of the present disclosure.
Figure 10D:
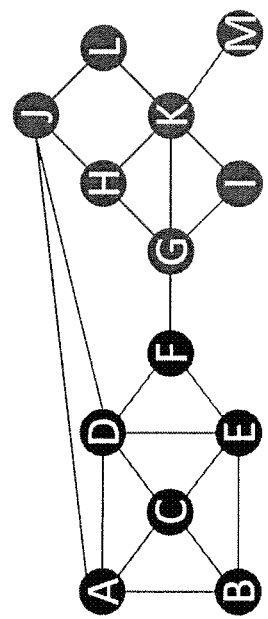
FIG. 10D shows a graph simplification method according to an embodiment of the present disclosure.

FIG. 10C shows a pattern layout including 14 patterns A-M and FIG. 10D shows a graph expression of the pattern layout of FIG. 10C. When the distance between the adjacent pattern is smaller than (or equal to or smaller than) the threshold distance, the nodes corresponding to such close patterns are connected by a link.

Figure 10H:
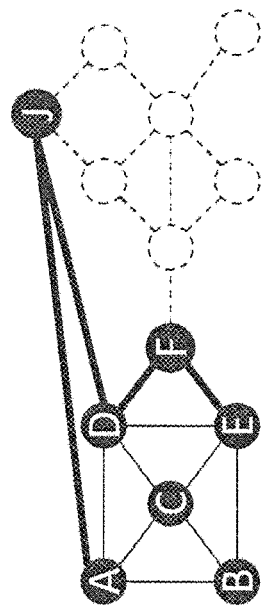
FIG. 10H shows a graph simplification method according to an embodiment of the present disclosure.
Figure 10I:
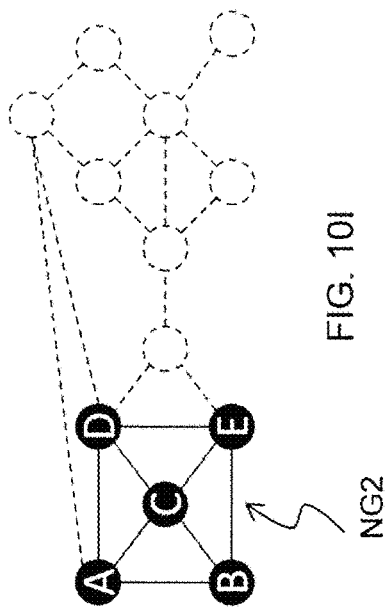
FIG. 10I shows a graph simplification method according to an embodiment of the present disclosure.
Figure 10E:
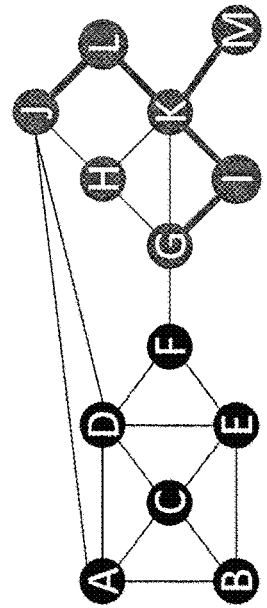
FIG. 10E shows a graph simplification method according to an embodiment of the present disclosure.
Figure 10F:
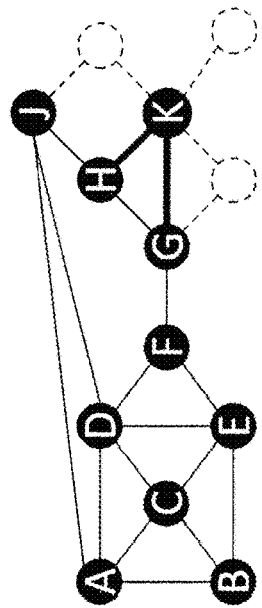
FIG. 10F shows a graph simplification method according to an embodiment of the present disclosure.
Figure 10G:
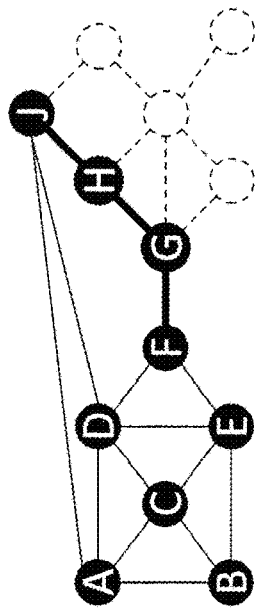
FIG. 10G shows a graph simplification method according to an embodiment of the present disclosure.

In FIGS. 10A-10I, the number of colors (N) is three (3), i.e., the degree is 3. Thus, a node having only one or two links is an insignificant node. For example, in FIG. 10E, three nodes I, L and M having only two links (degree=2) connected to two other nodes, respectively, are identified. Then, the three insignificant nodes are removed from the original graph together with the links connected to the removed insignificant nodes, as shown in FIG. 10F. After the removal of the three insignificant nodes, the remaining graph is analyzed to find new insignificant nodes caused by the removal of the three insignificant nodes. As shown in FIG. 10F, one new node K is identified as a new insignificant node. Then, the identified new insignificant node K is moved from the graph together with the links, as shown in FIG. 10G.

After the removal of the insignificant node K, the remaining graph is analyzed to find new insignificant nodes caused by the removal of the insignificant node K. As shown in FIG. 10G, two new nodes H and G are identified as new insignificant nodes. Then, the identified new insignificant nodes are moved from the graph together with the links, as shown in FIG. 10H.

After the removal of the two insignificant nodes, the remaining graph is analyzed to find new insignificant nodes caused by the removal of the three insignificant nodes. As shown in FIG. 10H, one new node J is identified as a new insignificant node. Then, the identified new insignificant node J is moved from the graph together with the links, as shown in FIG. 10I. As shown in FIG. 10I, the remaining graph includes a known colorable graph NG2. Thus, the entire original graph shown in FIG. 10D is determined as colorable. Accordingly, the layout pattern shown in FIG. 10C can be divided into three photo masks.

Figure 11:
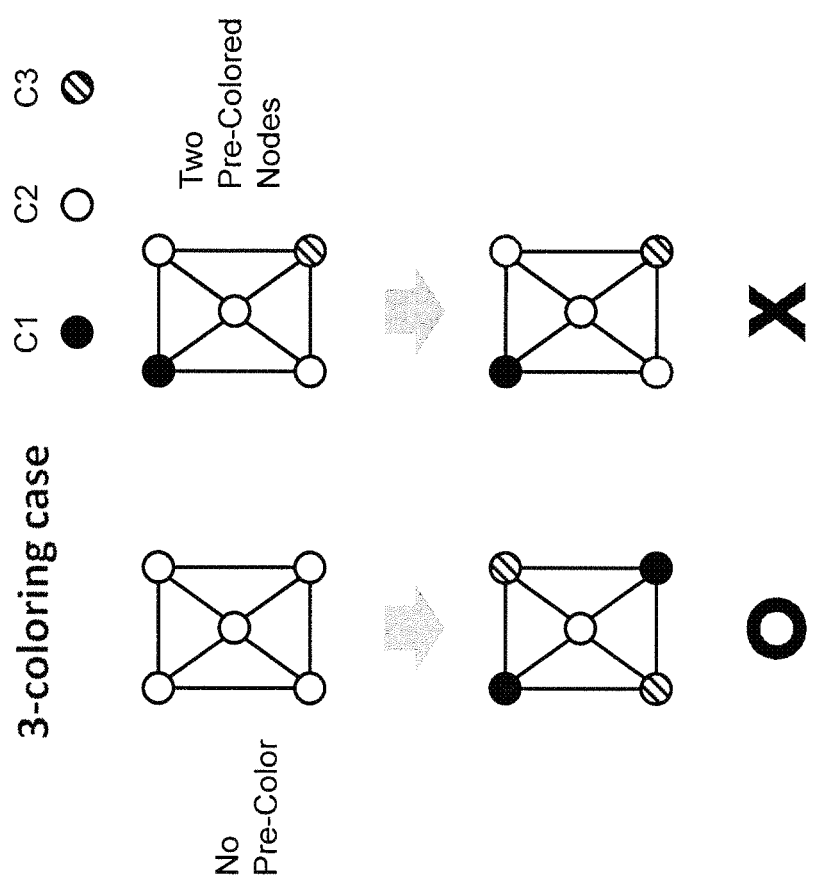
FIG. 11 shows coloring problems for cases in which one or more nodes are pre-colored.

As shown in FIG. 11, when one or more nodes are pre-colored, a graph which could otherwise be colored by N colors, may become un-colorable by the N colored.

Figure 12B:
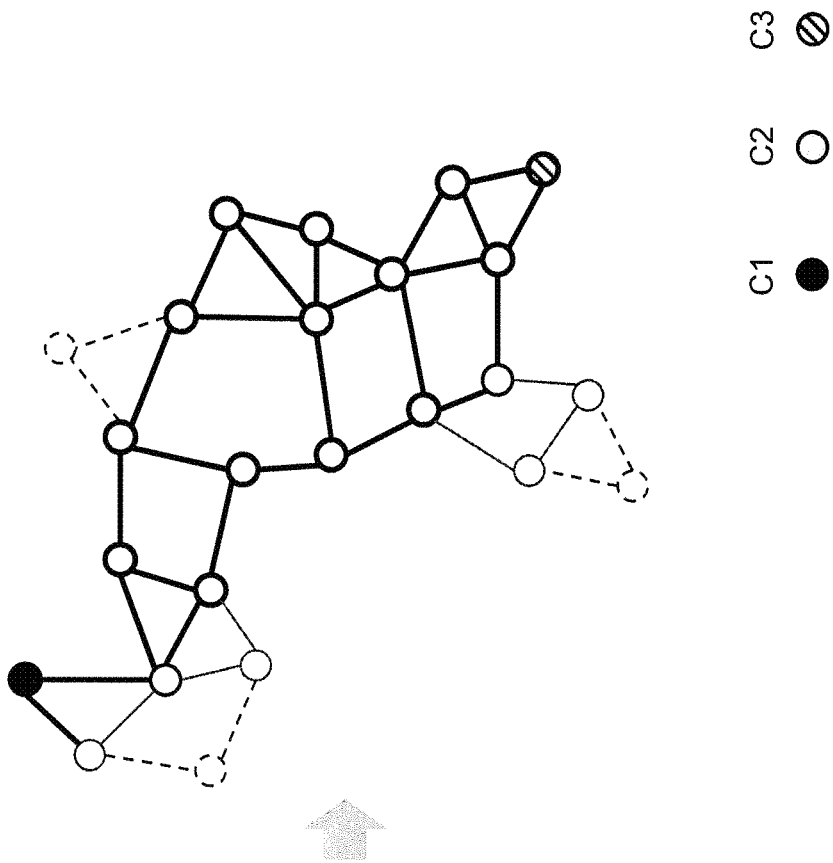
FIG. 12B shows a graph simplification method according to another embodiment of the present disclosure.
Figure 12A:
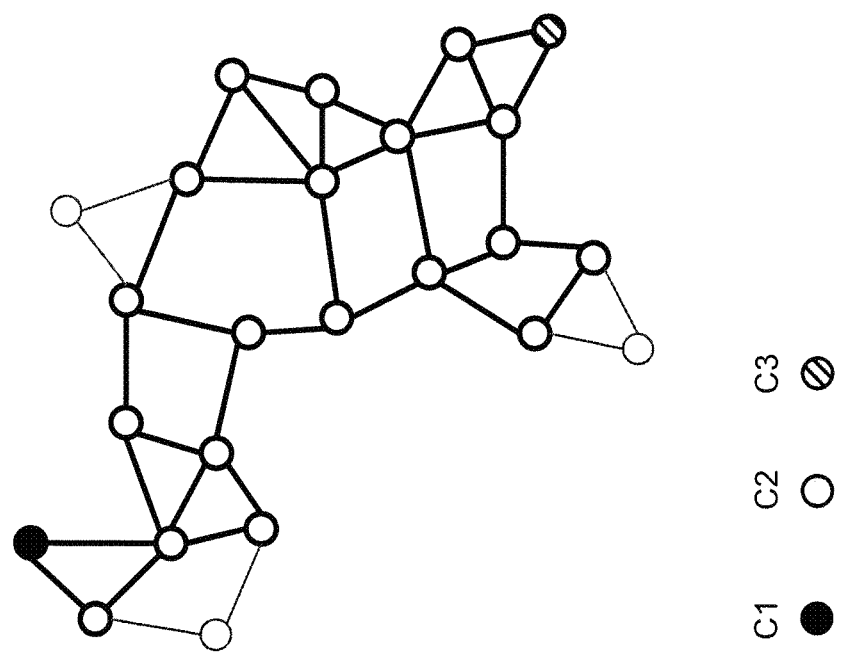
FIG. 12A shows a graph simplification method according to another embodiment of the present disclosure.

FIGS. 12A-12C show a simplification process in a case where the graph includes one or more pre-colored nodes. As shown in FIG. 12A, two nodes are pre-colored by color C1 and color C3. This means that the patterns corresponding to the pre-colored nodes are pre-assigned to two different photo masks.

Similar to FIGS. 5A-5D, a simplification process is performed on the original graph shown in FIG. 12A by removing insignificant nodes (degrees<3, where N=3). FIG. 12B shows the result after the first simplification operation. When the remaining graph formed by repeating the removal of insignificant nodes includes only the pre-colored nodes as shown in FIG. 12C, the original graph with pre-colored nodes is determined as colorable.

Once it is determined that the graph is colorable, the node coloring operation similar to FIGS. 6A-6C is performed to color all of the nodes. Then, based on the colored nodes, the original pattern layout is divided into three sets of mask data for three masks. Further, when the remaining graph includes one or more nodes other than the pre-colored nodes, it is determined whether the remaining nodes can be colored by different colors in consideration with the colors of the pre-colored nodes. When it is determined that the remaining nodes can be colored, the entire original graph is determined as colorable. If it is determined that the remaining nodes cannot be colored, the entire original graph is determined as un-colorable, and a notification thereof is output.

FIGS. 12D-12H show another case in which some of the nodes of the original graph are pre-colored in some embodiments.

Figure 12E:
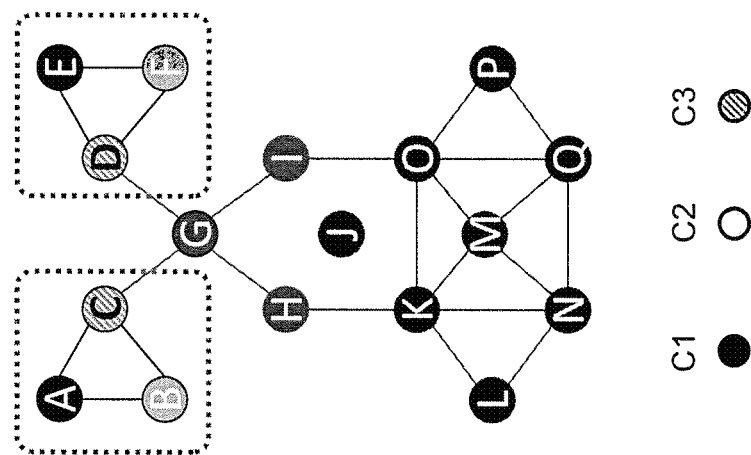
FIG. 12E shows a graph simplification method according to an embodiment of the present disclosure.
Figure 12D:
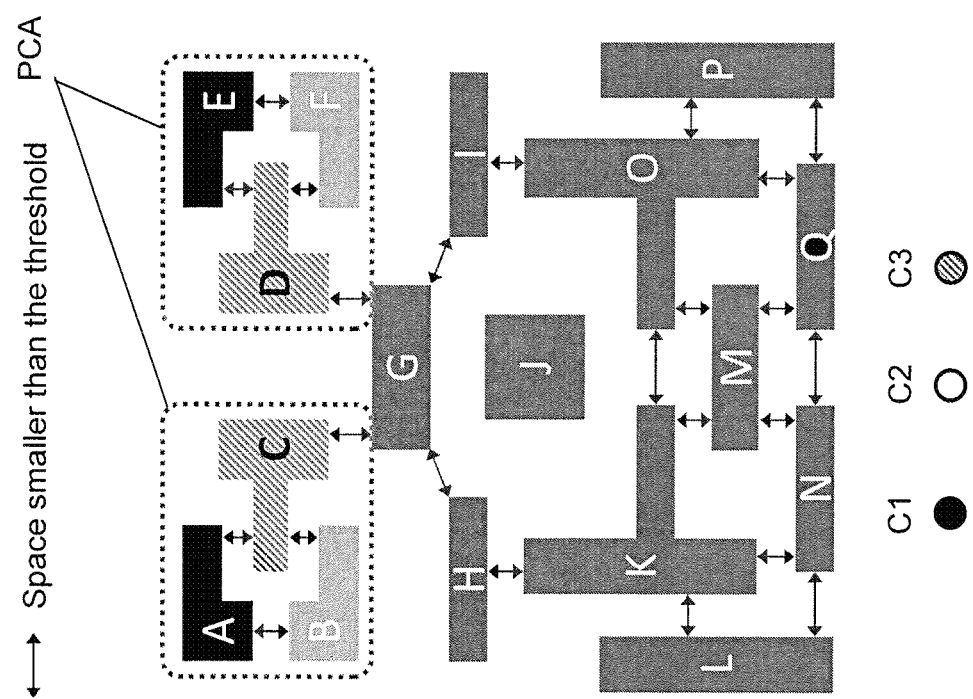
FIG. 12D shows a graph simplification method according to an embodiment of the present disclosure.

FIG. 12D shows a pattern layout including 17 patterns A-Q and FIG. 12E shows a graph expression of the pattern layout of FIG. 12D. When the distance between the adjacent pattern is smaller than (or equal to or smaller than) the threshold distance, the nodes corresponding to such close patterns are connected by a link.

In FIGS. 12D-12H, the number of colors (N) is three (3), i.e., the degree is 3. As shown in FIGS. 12D and 12E, patterns/nodes A-F are pre-colored with different three colors C1, C2 and C3. There pre-colored nodes are not removed in the graph simplification process.

Figure 12H:
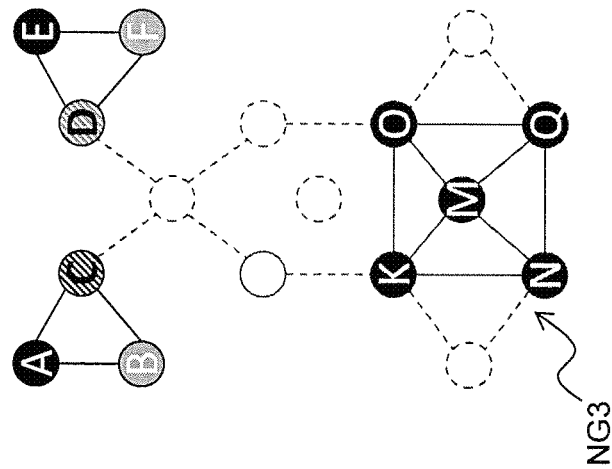
FIG. 12H shows a graph simplification method according to an embodiment of the present disclosure.
Figure 12G:
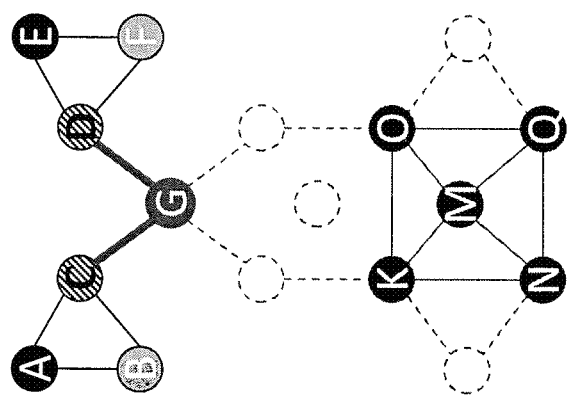
FIG. 12G shows a graph simplification method according to an embodiment of the present disclosure.
Figure 12F:
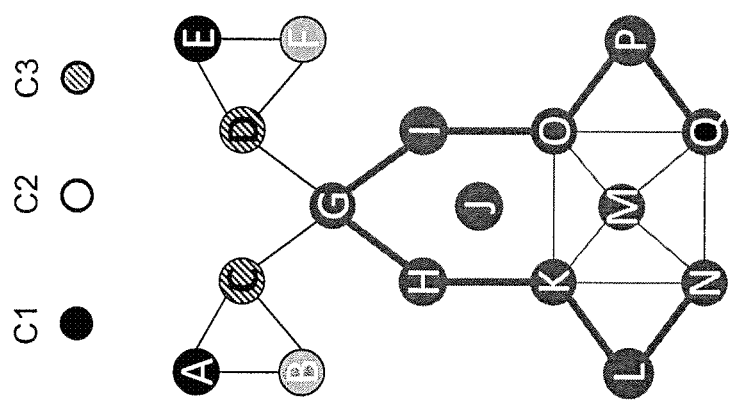
FIG. 12F shows a graph simplification method according to an embodiment of the present disclosure.

Similar to the foregoing embodiments, in FIG. 12FE, five nodes H, I J, L and P having only two links (degree=2) connected to two other nodes or no link, respectively, are identified. Then, the five insignificant nodes are removed from the original graph together with the links connected to the removed insignificant nodes, as shown in FIG. 12G. After the removal of the five insignificant nodes, the remaining graph is analyzed to find new insignificant nodes caused by the removal of the three insignificant nodes. As shown in FIG. 12G, one new node G is identified as a new insignificant node. Then, the identified new insignificant node G is moved from the graph together with the links, as shown in FIG. 12H. As shown in FIG. 12H, the remaining graph includes a known colorable graph NG3 and pre-colored nodes. Thus, the entire original graph shown in FIG. 12E is determined as colorable. Accordingly, the layout pattern shown in FIG. 12D can be divided into three photo masks.

FIGS. 12I-12L show another case in which some of the nodes of the original graph are pre-colored in other embodiments.

Figure 12J:
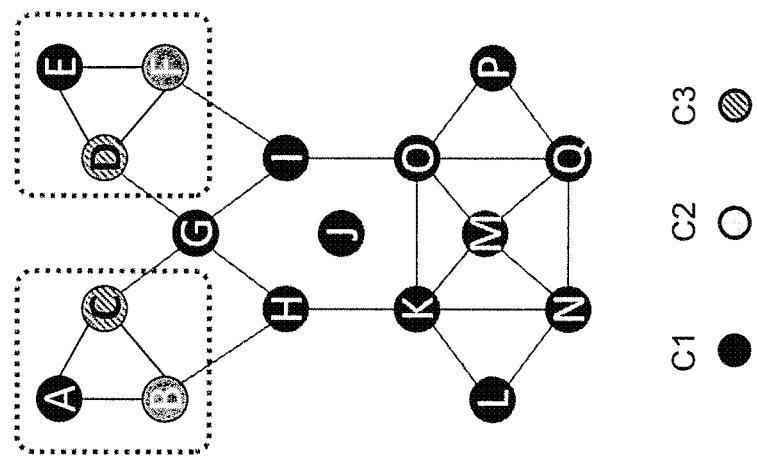
FIG. 12J shows a graph simplification method according to an embodiment of the present disclosure.
Figure 12I:
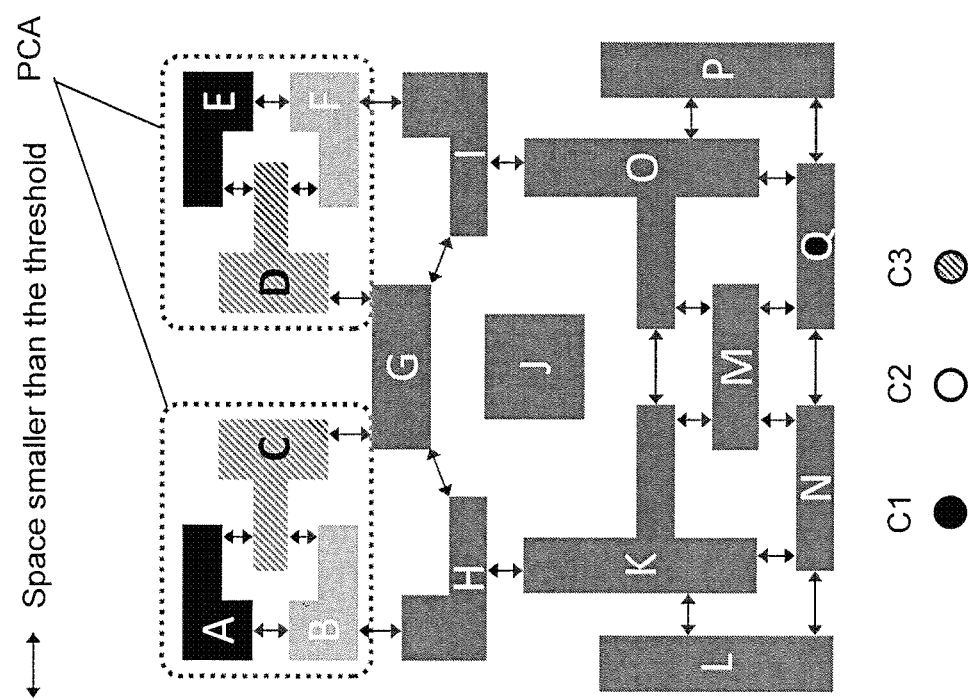
FIG. 12I shows a graph simplification method according to an embodiment of the present disclosure.

FIG. 12I shows a pattern layout including 17 patterns A-Q and FIG. 12J shows a graph expression of the pattern layout of FIG. 12I. When the distance between the adjacent pattern is smaller than (or equal to or smaller than) the threshold distance, the nodes corresponding to such close patterns are connected by a link. Unlike FIGS. 12D and 12E, there are links between nodes B and H and between node F and I, because the distances between patterns B and H and between patterns F and I are smaller than (or equal to or smaller than) the threshold distance.

In FIGS. 12I-12L, the number of colors (N) is three (3), i.e., the degree is 3. As shown in FIGS. 12I and 12J, patterns/nodes A-F are pre-colored with different three colors C1, C2 and C3. There pre-colored nodes are not removed in the graph simplification process.

Figure 12L:
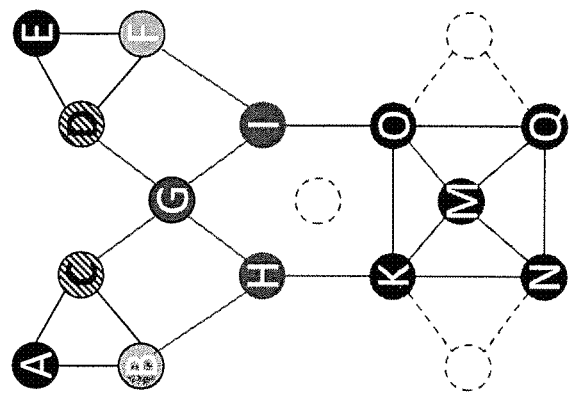
FIG. 12L shows a graph simplification method according to an embodiment of the present disclosure.
Figure 12K:
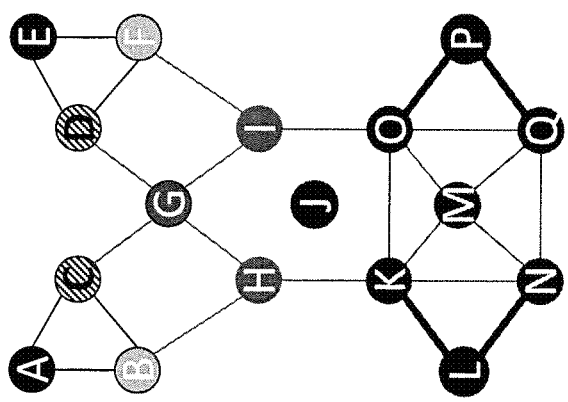
FIG. 12K shows a graph simplification method according to an embodiment of the present disclosure.

Similar to the foregoing embodiments, in FIG. 12K, three nodes J, L and P having only two links (degree=2) connected to two other nodes or no link, respectively, are identified. Then, the three insignificant nodes are removed from the original graph together with the links connected to the removed insignificant nodes, as shown in FIG. 12L. However, in this case, there is no significant node that can be removed in FIG. 12L, and the remaining graph is not made of known colorable graphs. In this case, it will be necessary to check if the remaining graph is colorable or not by using another method/process. In the case of FIG. 12L, the remaining graph can be colorable by three colors. If the remaining graph is determined as non-colorable by the additional process, the original layout pattern cannot be divided into three photo masks. In such a case, design modification will be necessary for the original pattern layout, or four or more photo masks will be used for the original pattern layout.

Figure 13:
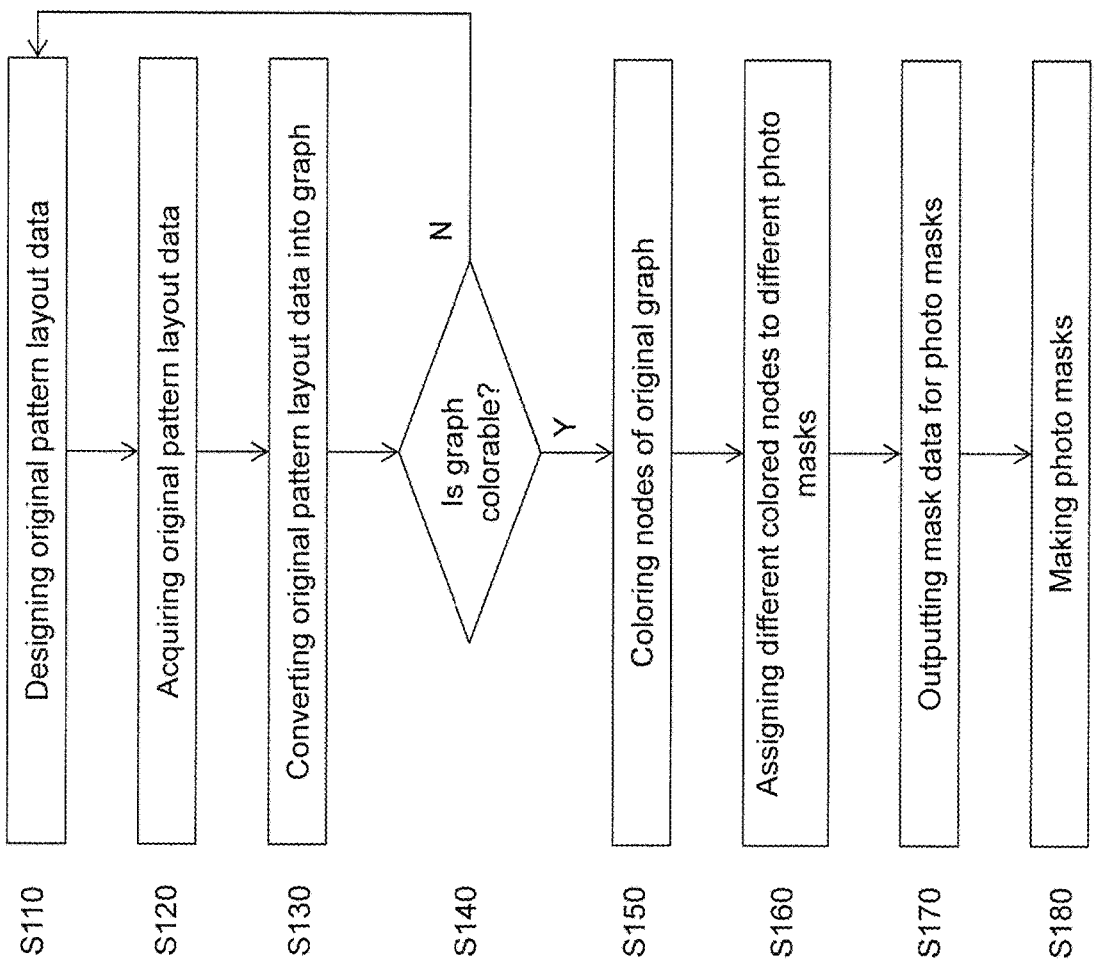
FIG. 13 shows a flowchart illustrating a method of manufacturing photo masks used for a multiple patterning process in a semiconductor manufacturing operation according to an embodiment of the present disclosure.

FIG. 13 shows a flowchart illustrating a method of manufacturing photo masks used for a multiple patterning process in a semiconductor manufacturing operation according to an embodiment of the present disclosure.

In S110, an original pattern layout is designed by using one or more mask designing tools. In S120, the original pattern layout is acquired by a photo mask data analyzing apparatus. In some embodiments, the photo mask data analyzing apparatus is a part of the mask designing tool. In S130, the acquired original pattern layout is converted, by the photo mask data analyzing apparatus, into a graph representation represented by nodes and links. In S140, it is determined, by the photo mask data analyzing apparatus, whether the graph is colorable by N-colors, where N is the number of photo masks used in the multiple patterning process. If it is determined that the graph is colorable by N-colors, the graph is colored by N colors, by the photo mask data analyzing apparatus. In S140, if is determined that the graph is not colorable by N-colors, the photo mask data analyzing apparatus requires a pattern designer to modify the pattern layout.

In S160, the colored graph is converted back to pattern layout with mask assignment according to the colors, by the photo mask data analyzing apparatus. In S170, the N sets of mask data for N photo masks are output by the mask designing tools or the photo mask data analyzing apparatus. Based on the output data, the photo masks are manufactured in S180.

Figure 14:
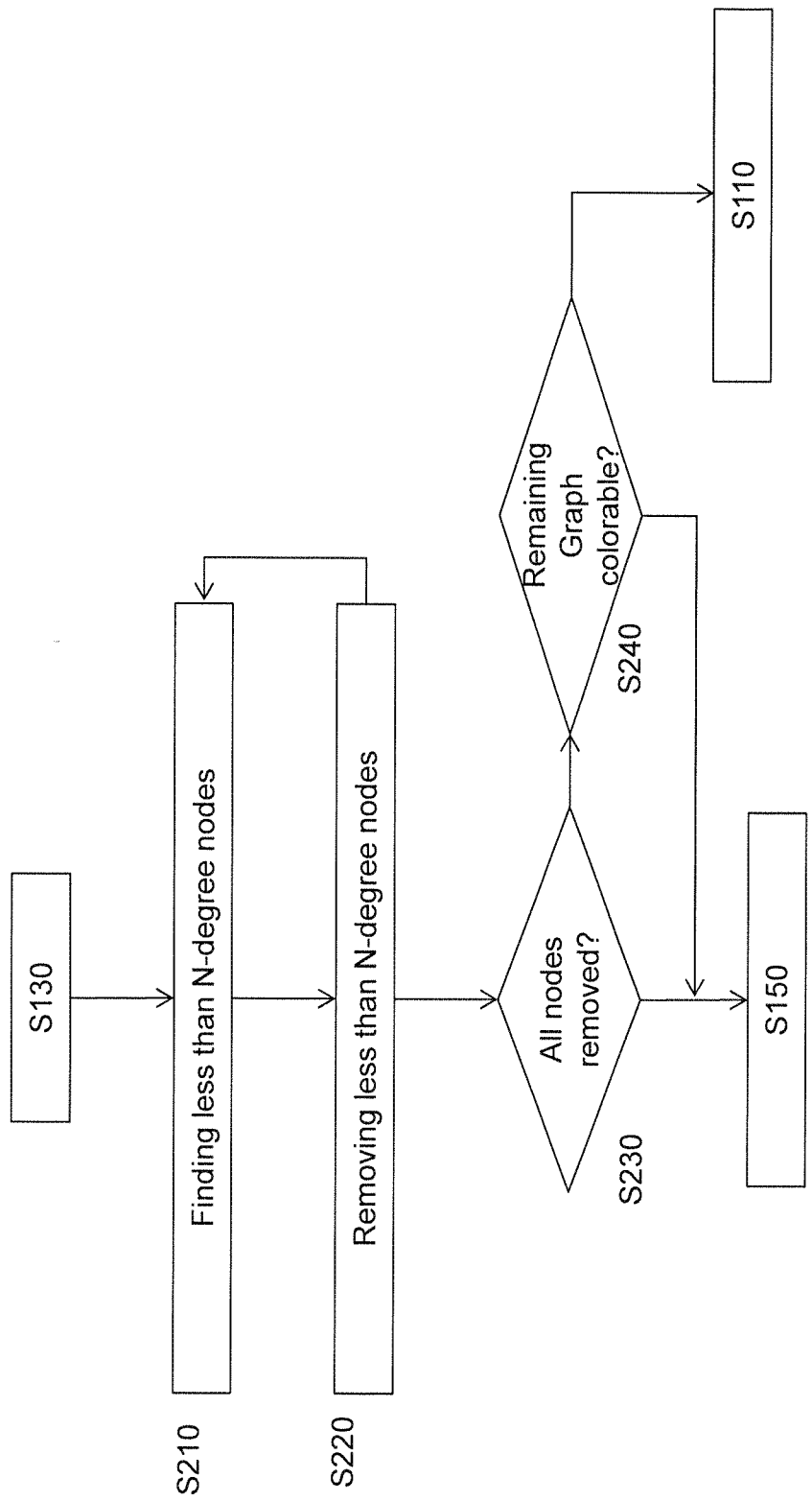
FIG. 14 shows a flowchart illustrating a graph simplification process according to an embodiment of the present disclosure.

FIG. 14 shows a flowchart illustrating a graph simplification process according to an embodiment of the present disclosure.

In S210, the photo mask data analyzing apparatus finds nodes having less than N-links (less than N-degree). Then, in S220, the photo mask data analyzing apparatus removes the found nodes. The operations of S210 and S220 are repeated. In S230, it is determined, by the photo mask data analyzing apparatus, whether all nodes are removed. If it is determined that all nodes are removed, the graph is determined as colorable. If there are remaining nodes, it is determined in S240 that whether the remaining nodes (graph) are colorable. If it is determined that the remaining graph is colorable, the entire original graph is determined as colorable.

When the original graph includes one or more pre-colored nodes, in S230, it is determined whether all nodes except for the pre-colored nodes are removed.

FIGS. 15A and 15B show a photo mask data analyzing apparatus according to an embodiment of the present disclosure. FIG. 15A is a schematic view of a computer system that executes the mask layout verification process described above. The foregoing embodiments may be realized using computer hardware and computer programs executed thereon. In FIG. 15A, a computer system 900 is provided with a computer 901 including an optical disk read only memory (e.g., CD-ROM or DVD-ROM) drive 905 and a magnetic disk drive 906, a keyboard 902, a mouse 903, and a monitor 904.

FIG. 15B is a diagram showing an internal configuration of the computer system 900. In FIG. 15B, the computer 901 is provided with, in addition to the optical disk drive 905 and the magnetic disk drive 906, one or more processors 911, such as a micro processing unit (MPU), a ROM 912 in which a program such as a boot up program is stored, a random access memory (RAM) 913 that is connected to the MPU 911 and in which a command of an application program is temporarily stored and a temporary storage area is provided, a hard disk 914 in which an application program, a system program, and data are stored, and a bus 915 that connects the MPU 911, the ROM 912, and the like. Note that the computer 901 may include a network card (not shown) for providing a connection to a LAN.

The program for causing the computer system 900 to execute the functions of the photo mask data analyzing apparatus in the foregoing embodiments may be stored in an optical disk 921 or a magnetic disk 922, which are inserted into the optical disk drive 905 or the magnetic disk drive 906, and be transmitted to the hard disk 914. Alternatively, the program may be transmitted via a network (not shown) to the computer 901 and stored in the hard disk 914. At the time of execution, the program is loaded into the RAM 913. The program may be loaded from the optical disk 921 or the magnetic disk 922, or directly from a network.

The program does not necessarily have to include, for example, an operating system (OS) or a third party program to cause the computer 901 to execute the functions of the photo mask data analyzing apparatus in the foregoing embodiments. The program may only include a command portion to call an appropriate function (module) in a controlled mode and obtain desired results.

In the programs, the functions realized by the programs do not include functions that can be realized only by hardware in some embodiments. For example, functions that can be realized only by hardware, such as a network interface, in an acquiring unit that acquires information or an output unit that outputs information are not included in the functions realized by the above-described programs. Furthermore, a computer that executes the programs may be a single computer or may be multiple computers.

Further, the entirety of or a part of the programs to realize the functions of the mask pattern verification apparatus is a part of another program used for photo mask fabrication processes in some embodiments. In addition, the entirety of or a part of the programs to realize the functions of the mask pattern verification apparatus is realized by a ROM made of, for example, a semiconductor device in some embodiments.

As set forth above, there has been no practical method to directly verify whether the mask pattern layout is dividable into N masks for a multiple patterning process and to assign the mask patterns to N photo masks. Even if the mask layout is converted into a graph representation with nodes and links, although it may not be impossible, a processing time to solve N-color problem for the graph including a huge number of nodes (corresponding to the patterns) is very long and is not practical. In contrast, in the present embodiments, by using a graph simplification process, it is possible to easily determine whether the graph is colorable, and thus it is possible to easily assign the mask patterns into different N photo masks. Further, even if there is a remaining graph, since the size of the remaining graph is sufficiently small such that the colorable verification process can be performed within a practical processing time.

It will be understood that not all advantages have been necessarily discussed herein, no particular advantage is required for all embodiments or examples, and other embodiments or examples may offer different advantages.

In accordance with an aspect of the present disclosure, in a method of manufacturing photo masks used in a semiconductor manufacturing process, a mask pattern layout in which a plurality of patterns are arranged is acquired. The plurality of patterns are converted into a graph having nodes and links. It is determined whether the nodes are colorable by N colors without causing adjacent nodes connected by a link to be colored by a same color, where N is an integer equal to or more than 3. When it is determined that the nodes are colorable by N colors, the nodes are colored with the N colors. The plurality of patterns are classified into N groups based on the N colored nodes. The N groups are assigned to N photo masks. N data sets for the N photo masks are output. In one or more of the foregoing and following embodiments, in the converting, when a minimum distance between two patterns is equal to or smaller than a threshold distance, nodes representing the two patterns are connected by a link, and when a distance between two patterns is greater than the threshold distance, nodes representing the two patterns are not connected by a link. In one or more of the foregoing and following embodiments, in the determining, the graph is simplified by repeating a removal of a node having less than N links from the graph, and when all nodes are removed, it is determined that the nodes are colorable by N colors. In one or more of the foregoing and following embodiments, when all nodes are not removed, it is determined whether a remaining graph is a known N-colorable pattern, and when it is determined that the remaining graph is a known N-colorable pattern, it is determined that the nodes are colorable by N colors. In one or more of the foregoing and following embodiments, when all nodes are not removed, it is determined whether a remaining graph is colorable by the N colors, and when it is determined that the remaining graph is colorable by the N colors, it is determined that the nodes are colorable by the N colors. In one or more of the foregoing and following embodiments, the plurality of patterns include one or more designated patterns. In the determining, the graph is simplified by repeating a removal of a node having less than N links from the graph but one or more nodes corresponding to the one or more designated patterns are not removed, and when all nodes except for one or more nodes corresponding to the one or more designated patterns are removed, it is determined that the nodes are colorable by N colors. In one or more of the foregoing and following embodiments, in each of the N data sets, any adjacent two patterns have a distance greater than the threshold distance. In one or more of the foregoing and following embodiments, in each of the N data sets, a minimum distance between any adjacent two patterns is N times the threshold distance. In one or more of the foregoing and following embodiments, the N photo masks are fabricated by using the N mask data sets.

In accordance with another aspect of the present disclosure, in a method of manufacturing a semiconductor device, a mask pattern layout in which a plurality of patterns are arranged is acquired. The plurality of patterns are converted into a graph having nodes and links. It is determined whether the nodes are colorable by N colors without causing adjacent nodes connected by a link to be colored by a same color, where N is an integer equal to or more than 3. When it is determined that the nodes are colorable by N colors, coloring the nodes with the N colors. The plurality of patterns are classified into N groups based on the N colored nodes. The N groups are assigned to N photo masks. N data sets for the N photo masks are output. The N photo masks are fabricated by using the N mask data sets. A layer is formed over a semiconductor substrate. The layer is patterned by using the N photo masks, thereby forming patterns corresponding to the mask pattern layout into the layer.

In accordance with another aspect of the present disclosure, a photo mask data analyzing apparatus includes a processor and a non-transitory memory storing a program. The program, when executed by the processor, causes the processor to perform: acquiring a mask pattern layout in which a plurality of patterns are arranged; converting the plurality of patterns into a graph having nodes and links; determining whether the nodes are colorable by N colors without causing adjacent nodes connected by a link to be colored by a same color, N being an integer equal to or more than 3; and when it is determined that the nodes are colorable by N colors, outputting a signal indicating that the mask pattern layout is dividable into N photo masks. In one or more of the foregoing and following embodiments, the program, when executed by the processor, further causes the processor to perform, when it is determined that the nodes are colorable by N colors: coloring the nodes with the N colors; classifying the plurality of patterns into N groups based on the N colored nodes; assigning the N groups to N photo masks; and outputting N data sets for the N photo masks. In one or more of the foregoing and following embodiments, in the converting, when a minimum distance between two patterns is equal to or smaller than a threshold distance, nodes representing the two patterns are connected by a link, and when a distance between two patterns is greater than the threshold distance, nodes representing the two patterns are not connected by a link. In one or more of the foregoing and following embodiments, in the determining, the graph is simplified by repeating a removal of a node having less than N links from the graph, and when all nodes are removed, it is determined that the nodes are colorable by N colors. In one or more of the foregoing and following embodiments, when all nodes are not removed, it is determined whether a remaining graph is a known N-colorable pattern, and when it is determined that the remaining graph is a known N-colorable pattern, it is determined that the nodes are colorable by N colors. In one or more of the foregoing and following embodiments, when all nodes are not removed, it is determined whether a remaining graph is colorable by the N colors, and when it is determined that the remaining graph is colorable by the N colors, it is determined that the nodes are colorable by N colors. In one or more of the foregoing and following embodiments, the plurality of patterns include one or more designated patterns. In the determining, the graph is simplified by repeating a removal of a node having less than N links from the graph but one or more nodes corresponding to the one or more designated patterns are not removed, and when all nodes except for one or more nodes corresponding to the one or more designated patterns are removed, it is determined that the nodes are colorable by N colors. In one or more of the foregoing and following embodiments, in each of the N data sets, any adjacent two patterns have a distance greater than the threshold distance. In one or more of the foregoing and following embodiments, in each of the N data sets, a minimum distance between any adjacent two patterns is N times the threshold distance. In one or more of the foregoing and following embodiments, the mask pattern layout and the N data are in GDS-II stream format or in Open Artwork System Interchange Standard format.

The foregoing outlines features of several embodiments or examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments or examples introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of generating photo mask data for photo masks used in a semiconductor manufacturing process, the method comprising:
   acquiring a mask pattern layout in which a plurality of patterns are arranged;
   converting the plurality of patterns into a graph having nodes and links, wherein each of the plurality of patterns are converted and the graph includes one or more pre-colored nodes;
   determining whether the nodes are colorable with respect to a degree defined by a number of the links to the nodes by N colors without removing the one or more pre-colored nodes and without causing adjacent nodes connected by a link to be colored by a same color, N being an integer equal to or more than 3, wherein the graph includes a node of which the degree is 1 or 2;
   when it is determined that the nodes are colorable by N colors, coloring the nodes with the N colors;
   classifying the plurality of patterns into N groups based on the N colored nodes;
   assigning the N groups to N photo masks; and
   outputting N data sets for the N photo masks.

2. The method of claim 1, wherein in the converting:
   when a minimum distance between two patterns is equal to or smaller than a threshold distance, nodes representing the two patterns are connected by a link, and
   when a distance between two patterns is greater than the threshold distance, nodes representing the two patterns are not connected by a link.

3. The method of claim 2, wherein in the determining:
   the graph is simplified by repeating a removal of a node having less than N links from the graph, and
   when all nodes are removed, it is determined that the nodes are colorable by N colors.

4. The method of claim 3, wherein:
   when all nodes are not removed, it is determined whether a remaining graph is a known N-colorable pattern, and
   when it is determined that the remaining graph is a known N-colorable pattern, it is determined that the nodes are colorable by N colors.

5. The method of claim 3, wherein:
   when all nodes are not removed, it is determined whether a remaining graph is colorable by the N colors, and
   when it is determined that the remaining graph is colorable by the N colors, it is determined that the nodes are colorable by N colors.

6. The method of claim 2, wherein:
   the plurality of patterns include one or more designated patterns,
   in the determining, the graph is simplified by repeating a removal of a node having less than N links from the graph but one or more nodes corresponding to the one or more designated patterns are not removed, and
   when all nodes except for one or more nodes corresponding to the one or more designated patterns are removed, it is determined that the nodes are colorable by N colors.

7. The method of claim 2, wherein in each of the N data sets, any adjacent two patterns have a distance greater than the threshold distance.

8. The method of claim 7, wherein in each of the N data sets, a minimum distance between any adjacent two patterns is N time the threshold distance.

9. A method of manufacturing photo masks used in a semiconductor manufacturing process, the method comprising:
   acquiring a mask pattern layout in which a plurality of patterns are arranged;
   converting the plurality of patterns into a graph having nodes and links, wherein each of the plurality of patterns are converted and the graph includes one or more pre-colored nodes;
   determining whether the nodes are colorable with respect to a degree defined by a number of the links to the nodes by N colors without removing the one or more pre-colored nodes and without causing adjacent nodes connected by a link to be colored by a same color, N being an integer equal to or more than 3, wherein the graph includes a node of which the degree is 1 or 2;
   when it is determined that the nodes are colorable by N colors, coloring the nodes with the N colors;
   classifying the plurality of patterns into N groups based on the N colored nodes;
   assigning the N groups to N photo masks;
   outputting N data sets for the N photo masks; and
   fabricating the N photo masks by using the N mask data sets.

10. The method of claim 9, wherein in the converting:
    when a minimum distance between two patterns is equal to or smaller than a threshold distance, nodes representing the two patterns are connected by a link, and
    when a distance between two patterns is greater than the threshold distance, nodes representing the two patterns are not connected by a link.

11. An apparatus for analyzing a photo mask data for photo masks used in a semiconductor manufacturing process, the apparatus comprising:
    a processor; and
    a non-transitory, computer-readable storage medium storing a program, the program, when executed by the processor, causes the processor to perform:
       acquiring a mask pattern layout in which a plurality of patterns are arranged;
       converting the plurality of patterns into a graph having nodes and links, wherein each of the plurality of patterns are converted and the graph includes one or more pre-colored nodes;
       determining whether the nodes are colorable with respect to a degree defined by a number of the links to the nodes by N colors without removing the one or more pre-colored nodes and without causing adjacent nodes connected by a link to be colored by a same color, N being an integer equal to or more than 3, wherein the graph includes a node of which the degree is 1 or 2 and one or more pre-colored nodes;

when it is determined that the nodes are colorable by N colors, coloring the nodes with the N colors;

classifying the plurality of patterns into N groups based on the N colored nodes;

assigning the N groups to N photo masks; and outputting N data sets for the N photo masks.

12. The apparatus of claim 11, wherein:

the program, when executed by the processor, further causes the processor to perform, when it is determined that the nodes are colorable by N colors:

coloring the nodes with the N colors;

classifying the plurality of patterns into N groups based on the N colored nodes;

assigning the N groups to N photo masks; and outputting N data sets for the N photo masks.

13. The apparatus of claim 12, wherein in the converting:

when a minimum distance between two patterns is equal to or smaller than a threshold distance, nodes representing the two patterns are connected by a link, and when a distance between two patterns is greater than the threshold distance, nodes representing the two patterns are not connected by a link.

14. The apparatus of claim 13, wherein in the determining:

the graph is simplified by repeating a removal of a node having less than N links from the graph, and when all nodes are removed, it is determined that the nodes are colorable by N colors.

15. The apparatus of claim 14, wherein:

when all nodes are not removed, it is determined whether a remaining graph is a known N-colorable pattern, and when it is determined that the remaining graph is a known N-colorable pattern, it is determined that the nodes are colorable by N colors.

16. The apparatus of claim 14, wherein:

when all nodes are not removed, it is determined whether a remaining graph is colorable by the N colors, and when it is determined that the remaining graph is colorable by the N colors, it is determined that the nodes are colorable by N colors.

17. The apparatus of claim 13, wherein:

the plurality of patterns include one or more designated patterns, in the determining, the graph is simplified by repeating a removal of a node having less than N links from the graph but one or more nodes corresponding to the one or more designated patterns are not removed, and when all nodes except for one or more nodes corresponding to the one or more designated patterns are removed, it is determined that the nodes are colorable by N colors.

18. The apparatus of claim 13, wherein in each of the N data sets, any adjacent two patterns have a distance greater than the threshold distance.

19. The apparatus of claim 18, wherein in each of the N data sets, a minimum distance between any adjacent two patterns is N times the threshold distance.

20. The apparatus of claim 12, wherein the mask pattern layout and the N data are in GDS-II stream format or in Open Artwork System Interchange Standard format.

* * * * *